US 12,505,921 B2
Dec. 23, 2025

(12) United States Patent
Larusson et al.

(54) PLATFORM FOR ROUTING CLINICAL DATA

(71) Applicant: ScribeAmerica, LLC, Fort Lauderdale, FL (US)

(72) Inventors: Fridrik Larusson, Seattle, WA (US); Vadim Vitalyevich Khazan, Seattle, WA (US)

(73) Assignee: ScribeAmerica, LLC, Fort Lauderdale, FL (US)

( * ) Notice: Subject to any disclaimer, the term of this patent is extended or adjusted under 35 U.S.C. 154(b) by 276 days.

(21) Appl. No.: 17/816,878

(22) Filed: Aug. 2, 2022

(65) Prior Publication Data

US 2024/0047049 A1 Feb. 8, 2024

(51) Int. Cl.
*G16H 40/20* (2018.01)
*G16H 10/60* (2018.01)
*G16H 40/67* (2018.01)

(52) U.S. Cl.
CPC ............ *G16H 40/20* (2018.01); *G16H 10/60* (2018.01); *G16H 40/67* (2018.01)

(58) Field of Classification Search
None
See application file for complete search history.

(56) References Cited

U.S. PATENT DOCUMENTS

| | | | | |
|---|---|---|---|---|
| 7,016,844 | B2 * | 3/2006 | Othmer | H04L 67/12 704/E15.047 |
| 8,903,901 | B2 * | 12/2014 | Archbold | G06Q 10/10 705/7.14 |
| 11,862,302 | B2 * | 1/2024 | Pinter | G06N 3/044 |
| 2003/0204431 | A1 | 10/2003 | Ingman | |
| 2010/0094657 | A1 * | 4/2010 | Stern | G16H 40/63 715/845 |
| 2011/0046983 | A1 | 2/2011 | Soble et al. | |
| 2013/0317818 | A1 * | 11/2013 | Bigham | G10L 15/26 704/235 |
| 2014/0222462 | A1 | 8/2014 | Shakil et al. | |
| 2015/0312533 | A1 | 10/2015 | Moharir | |
| 2018/0166081 | A1 | 6/2018 | Koll et al. | |
| 2018/0240538 | A1 | 8/2018 | Koll et al. | |
| 2018/0315428 | A1 * | 11/2018 | Johnson | G10L 15/26 |
| 2019/0057760 | A1 | 2/2019 | Schwartz et al. | |
| 2019/0065464 | A1 * | 2/2019 | Finley | G06N 3/044 |
| 2019/0166435 | A1 | 5/2019 | Crow et al. | |
| 2019/0208354 | A1 | 7/2019 | Raduchel et al. | |
| 2019/0272147 | A1 | 9/2019 | Vozila et al. | |

(Continued)

FOREIGN PATENT DOCUMENTS

WO WO 2019/078887 4/2019
WO WO 2022/072346 4/2022

OTHER PUBLICATIONS

International Search Report and Written Opinion in International Appln. No. PCT/US2023/016758, mailed on Jul. 10, 2023, 10 pages.

(Continued)

*Primary Examiner* — Alaaeldin M. Elshaer
*Assistant Examiner* — Ashley Elizabeth Evans
(74) *Attorney, Agent, or Firm* — Fish & Richardson P.C.

(57) ABSTRACT

Some implementations of a computer system or a computer-implemented method facilitate the routing of data for clinical notes or other portions of electronic health records that summarize a session between a patient and a health care provider.

23 Claims, 18 Drawing Sheets

(56) References Cited

U.S. PATENT DOCUMENTS

| | | |
|---|---|---|
| 2019/0272896 A1 | 9/2019 | Vozila et al. |
| 2019/0272902 A1 | 9/2019 | Vozila et al. |
| 2020/0126643 A1 | 4/2020 | D'Souza et al. |
| 2020/0168303 A1 | 5/2020 | Cane et al. |
| 2020/0342966 A1* | 10/2020 | Stern ..................... G06Q 30/04 |
| 2021/0398630 A1 | 12/2021 | Sadeghi et al. |
| 2022/0051772 A1* | 2/2022 | Gallopyn ............... G16H 40/67 |
| 2023/0317225 A1* | 10/2023 | Larusson ............... G16H 40/20 |
| | | 705/3 |
| 2023/0420001 A1* | 12/2023 | Washington ......... G11B 27/034 |

OTHER PUBLICATIONS

International Search Report and Written Opinion in International Appln. No. PCT/US2023/029117, mailed on Dec. 13, 2023, 19 pages.

* cited by examiner

Project A

■ Completed On Time  □ Completed Overdue  ← Feb. 3 – Feb. 9, 2022 →

| THU 2/3 | FRI 2/4 | SAT 2/5 | SUN 2/6 | MON 2/7 | TUE 2/8 | WED 2/9 |

45 Encounters Received

2 Encounters Overdue

3 min, 35 sec Audio Length / Encounter

55 min Median Assigned to Completed

| Workday ID | Identity Provider | ERH | Division | Billing Type | Region | Specialty |

Scribes | Providers

🔍 Search

| Name | | Scheduled | Available | Due (4hrs) | Overdue |
|---|---|---|---|---|---|
| Provider A1 | View Profile | 12 | 3 | 2 | 1 |
| Provider A2 | View Profile | 8 | 3 | 1 | 0 |
| Provider A3 | View Profile | 11 | 2 | 2 | 0 |
| Provider A4 | View Profile | 10 | 1 | 0 | 0 |

(Add Provider)

← Providers

Provider A1

| 1 Overdue | 0 STAT | Due (4hrs) 2 | 3 Available |

Today's Snapshot

Encounters Scheduled
12

Project: Project A

Time Zone: America/Los Angeles

SLA: 24

Transcribe Audio: ☑

History of present illness

Separate each medical problem reviewed into its own paragraph.

Allergies/meds/histories

Nurses will update this during intake, pull in from Nurse's notes.

Assessment and plan

If dictating, may occasionally state A&P info while dictating the HPI.

Review of systems

Templates:
Full Adult – Default for patients 18 years or older.
Full Child – Default for patients under age 18.

Physical exam

Annual Medicare – If EHR indicates patient is being seen for annual Medicare evaluation, use this template.

Templates

| Encounters | Schedules | Projects | Providers | Scribes | Training | Help |
|---|---|---|---|---|---|---|

Provider A1

| | 10 THU Feb | 11 FRI Feb | 12 SAT Feb | 13 SUN Feb |
|---|---|---|---|---|
| | Yesterday | Today | Tomorrow | Tomorrow +1 |
| 4:30 PM | | | | |
| 5:00 PM | | | | |
| 5:30 PM | | Add Encounter (5:15 PM) | | |
| 6:00 PM | | | | |
| 6:30 PM | | | | |
| 7:00 PM | | | | |

Add Encounter

Encounters Schedules Projects Providers Scribes Training Help

| 45<br>Encounters<br>Received | 31<br>Encounters<br>Completed |
|---|---|
| 62<br>Encounters<br>Scheduled | 7<br>Scribes Online |

Available Encounters — 402

Provider A1 / Patient E / Audio: 2 files, 120 sec / Due: 2/11, 4:30 PM [Assign]
Provider A2 / Patient F / Audio: 2 files, 90 sec / Due: 2/11, 4:40 PM [Assign]
Provider A4 / Patient G / Audio: 1 file, 150 sec / Due: 2/11, 4:45 PM [Assign]
Provider A3 / Patient H / Audio: 1 file, 100 sec / Due: 2/11, 4:45 PM [Assign]

Q Search

[All Encounters] | My Encounters — 406

Clear Filters

| Last Update | Project: All | Provider: All | Patient | Audio Duration | Scheduled | Due | Status: All | Assigned to: All |
|---|---|---|---|---|---|---|---|---|
| 3:30 PM | Project B | Provider B1 | Patient A | 1 file, 60 sec | 2/11 | 5:30 PM | Working | scribe_b@soundlines.com |
| 3:32 PM | Project A | Provider A2 | Patient B | 2 files, 130 sec | 2/11 | 5:45 PM | Waiting | scribe_d@soundlines.com |
| 3:35 PM | Project A | Provider A1 | Patient C | 1 file, 85 sec | 2/11 | STAT | Working | scribe_e@soundlines.com |
| 3:35 PM | Project A | Provider A3 | Patient D | 3 files, 210 sec | 2/11 | 5:50 PM | Working | scribe_a@soundlines.com |

404

410

*Notifications* — 412

New audio for encounter by Provider A1 — View
Encounter overdue for Provider A1 — View
New encounter available from Provider B2 — View

Report Issues
Select the issues that are preventing you from entering this encounter into the EHR. These issues will be shared with the provider.

Patient Info
☐ Missing name ☐ Incorrect name
☐ Missing date of birth ☐ Incorrect date of birth
☐ Missing MRN ☐ Incorrect MRN

Specialty Statuses
☐ Waiting
☐ Missing information _____

Audio Quality
☐ Noisy recording _____
☐ Unclear or inaudible speaking _____

Other Issue
☐ Other _____

☐ Flag Encounter and Notify Provider
This will send a notification to the provider and notify them that there is an issue.

[ Cancel ] [ Save ]

Complete the Encounter

Patients

Name _____ DOB _____ MRN _____ Category [Select ▶]

[Add Patient]

[Mark Completed] [Return]

480

FIG. 4E ically selected clinical note generation task for a remote scribe; providing data representing the automatically selected clinical note generation task to a remote scribe device for presentation at a clinical note generation interface of the remote scribe device; receiving, from the remote scribe device, a task completion notification that indicates that the automatically selected clinical note generation task has been completed; responsive to receiving the task completion notification, providing to a practitioner interface device, the task completion notification; and after providing the task completion notification to the practitioner interface device, receiving, from the practitioner interface device, feedback data that pertains to the completed clinical note generation task.

PLATFORM FOR ROUTING CLINICAL DATA

TECHNICAL FIELD

This specification generally relates to a platform for routing clinical data, such as clinical notes or other portions of electronic health records that summarize a session between a patient and a health care provider.

BACKGROUND

When conducting a session with a patient, a health care provider typically asks the patient various questions in order to understand the patient's condition for purposes of achieving a diagnosis or improved outcome. For example, the health care provider can inquire about the patient's medical history, the nature of current symptoms the patient is experiencing, medications currently being taken by the patient, and so forth. After examining the patient and arriving at a diagnosis, the health care provider can formulate a plan for treating the patient, which may include various therapies and medical prescriptions. A clinical note that documents the session, including the patient's feedback to the questions and, optionally, the diagnosis and treatment plan, can be generated for storage by an electronic health record (EHR) system. Sometimes, medical scribes are employed to assist the health care provider with preparing and submitting the clinical note.

SUMMARY

This document generally describes computer systems, processes, program products, and devices for routing data for clinical notes or other portions of electronic health records that summarize a session between a patient and a health care provider. Some implementations of the system described herein can provide a simplified interface for a physician or other health care provider, can efficiently route session information to one or more remote medical scribes, and can provide an improved scribe interface that enhances each scribe's capability to rapidly filter and accurately summarize the session information to generate clinical notes for importation into the healthcare provider's electronic health record (EHR) system. In some embodiments, an onboarding process can be conducted with a health care provider, during which various preferences of the health care provider are collected and recorded (e.g., an electronic health record (EHR) system used by the provider, templates used by the provider, and other relevant preferences). The health care provider can conduct a health care session with a patient, during which the health care provider and the patient discuss various topics. Based on the discussion and on the health care provider's observations, the health care provider can diagnose the patient and can determine an appropriate treatment plan. The health care provider can use a portable computer device (e.g., carried during the session with the patient) to upload a recording of the session to a server system, along with other session information. The server system can process the recording, and can provide the processed recording, a transcription of the recording, the session information (e.g., information that specifically pertains to the particular health care session between the health care provider and the patient), and additional metadata that is associated with the health care provider and is not specific to the particular health care session, to a remote computing device operated by an authorized medical scribe for purpose of generating a clinical note for the session. After the clinical note has been generated by the scribe, the scribe interface at the remote computing device can be used to upload the clinical note to an EHR system, the health care provider can receive a notification that the clinical note is complete and, optionally, can be prompted to review and approve the clinical note generated by the remote scribe.

In some implementations, a method may be performed by data processing apparatuses. The method includes receiving, by a server system and from a practitioner interface device, encounter data of a health care session conducted between a health care provider and a patient; determining, by the server system, a complexity score for a clinical note generation task for the health care session, based at least in part on (i) a length of audio included in the encounter data, and (ii) a session type of the health care session; storing the encounter data with the determined complexity score of the clinical note generation task in an encounter data pool, along with previously received encounter data for previous health care sessions and previously determined complexity scores for other clinical note generation tasks; receiving, by the server system and from a remote scribe device, an indication that a remote scribe is available to work on a clinical note; in response to receiving the indication, retrieving, by the server system, a quality score of the remote scribe, and authorization information of the remote scribe; automatically selecting, by the server system from the encounter data pool, a clinical note generation task for the remote scribe, based at least in part on (i) the complexity score of the clinical note generation task, (ii) the quality score of the remote scribe, and (iii) the authorization information of the remote scribe; and providing data representing the selected clinical note generation task, by the server system and to the remote scribe device for presentation at a clinical note generation interface of the remote scribe device.

In some implementations, another method that may be performed by data processing apparatuses includes receiving encounter data of a health care session conducted between a health care provider and a patient; storing the encounter data in an encounter data pool, along with previously received encounter data for previous health care sessions; receiving an indication that a remote scribe is available to work on a clinical note; in response to receiving the indication, retrieving authorization information of the remote scribe; automatically selecting, from the encounter data pool, a clinical note generation task for the remote scribe, based at least in part on the authorization information of the remote scribe; and providing data representing the selected clinical note generation task to a remote scribe device for presentation at a clinical note generation interface of the remote scribe device.

In some implementations, another method that may be performed by data processing apparatuses includes automat In some implementations, another method that may be performed by data processing apparatuses includes automatically selecting a clinical note generation task for a remote scribe; providing data representing the automatically selected clinical note generation task to a remote scribe device for presentation at a clinical note generation interface of the remote scribe device; receiving, from the remote scribe device, a task incompletion notification that indicates that the remote scribe is unable to complete the automatically selected clinical note generation task; and responsive to receiving the task incompletion notification, (i) automatically selecting a different clinical note generation task for the remote scribe, and (ii) providing data representing the different clinical note generation task to the remote scribe device for presentation at the clinical note generation interface of the remote scribe.

Other implementations of these aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other implementations may optionally include any or all of the following features. Automatically selecting the clinical note generation task for the remote scribe device can include filtering the encounter data pool to exclude encounter data of health care sessions for which the remote scribe is not authorized to work on clinical note generation tasks, based on the authorization information of the remote scribe. Automatically selecting the clinical note generation task for the remote scribe device can include, for each health care session represented in the encounter data pool, estimating an amount of time for the remote scribe to complete the clinical note generation task, based at least in part on the length of audio included in the encounter data of the health care session; determining an amount of time remaining in the remote scribe's shift; and filtering the encounter data to exclude encounter data of health care sessions for which the estimated amount of time for the remote scribe to complete the clinical note generation task exceeds the amount of time remaining in the remote scribe's shift. Automatically selecting the clinical note generation task for the remote scribe can include prioritizing clinical note generation tasks for the health care sessions represented in the encounter data pool; and selecting, from the prioritized clinical note generations tasks, a top clinical note generation task for which the remote scribe's quality score meets a threshold value corresponding to the complexity score of the clinical note generation task. The remote scribe can be placed in a pool of remote scribes that have similar quality scores and that are authorized to work on similar clinical note generation tasks. The selected clinical note generation task can be aligned for completion by any of the remote scribes in the pool of remote scribes. A task completion notification can be received, by the server system and from the remote scribe device. The task completion notification can indicate that the selected clinical note generation task has been completed. Responsive to receiving the task completion notification, the task completion notification can be provided by the server system and to the practitioner interface device. After providing the task completion notification to the practitioner interface device, feedback data that pertains to the completed clinical note generation task can be received from the practitioner interface device. The quality score of the remote scribe can be adjusted based on the received feedback data that pertains to the completed clinical note generation task. The complexity scores of other clinical note generation tasks for other health care sessions conducted by the health care provider can be adjusted, based on the received feedback data that pertains to the completed clinical note generation task. A task incompletion notification can be received by the server system and from the remote scribe device. The task incompletion notification can indicate that the remote scribe is unable to complete the selected clinical note generation task. Responsive to receiving the task incompletion notification, the encounter data can be returned to the encounter data pool, and the complexity score of the selected clinical note generation task can be adjusted. Multiple different quality scores can be maintained for the remote scribe, each quality score pertaining to a different encounter factor. Retrieving the quality score of the remote scribe can include retrieving the quality score that pertains to the encounter factor of the health care session.

The systems, devices, program products, and processes described throughout this document can, in some instances, provide one or more of the following advantages. When a health care provider ends a session recording, a practitioner interface device can automatically begin transferring an audio file to a system server using resumable upload techniques, such that a file transfer can resume from a last point of transfer (rather that from the beginning), if a transfer is interrupted at any point due to a poor network connection. After an audio file has been successfully uploaded, the uploaded file can be deleted from local storage of the practitioner interface device, thus freeing up storage resources. By trimming and noise filtering uploaded audio files, downstream processes can be more efficiently and accurately performed, and data storage can be conserved. Audio files related to health care sessions can be automatically routed to suitable medical scribes that can complete clinical notes for the health care sessions in a timely manner. The automatic selection of suitable tasks for medical scribes can be efficiently solved through interactions between platform devices, and through the maintenance and use of task complexity scores and scribe quality scores. A prioritized set of tasks can be customized for each medical scribe in a pool of scribes, based on factors related to the tasks and based on specific skills of the scribes. Complex tasks can potentially be re-routed from a first scribe to another scribe, based on manual flagging, automatic monitoring of task deadlines and scribe working statuses, or other suitable routing criteria. A health care provider can receive, through an application interface presented by the practitioner interface device, timely notifications of issues with the audio files (or related metadata) that would interfere with the generation of a clinical note. A clinical note generation interface can include multiple related portions serving different functions, with one portion of the interface being used by a medical scribe for working on a clinical note, and easy reference to source information and instructions for generating the note being provided through other portions of the interface. Automatically highlighting key terms in a transcript and/or pre-populating a note generation working area (e.g., based on automatically selected note templates and relevant clinical information) can facilitate quick identification of relevant portions of a transcript and generation of a clinical note. Mapping a transcript to a media file can facilitate reviewing and verifying the transcript. Medical scribes can generate clinical notes for health care sessions independent of health care providers, such that downtime of the medical scribes is minimized. Clinical notes can be automatically provided to a health care provider's electronic health record (EHR) system. A mechanism can be included for health care providers to easily provide feedback for specific tasks through the clinical data platform, such that the feedback can be provided without directly including specific patient information, thus ensuring patient data privacy.

Other features, aspects and potential advantages will be apparent from the accompanying description and figures.

DESCRIPTION OF DRAWINGS

FIGS. 3A-E depict example interfaces for onboarding health care providers and medical scribes onto a platform for facilitating the generation of clinical notes.

FIGS. 4A-E depict example interfaces for facilitating the generation of clinical notes.

Like reference symbols in the various drawings indicate like elements.

DETAILED DESCRIPTION

This document describes technology that can facilitate the routing of clinical data, such as clinical notes or other portions of electronic health records that summarize a session between a patient and a health care provider. In general, a health care provider (e.g., a physician, a nurse, or other practitioner who performs medical services for a patient) can conduct a health care session with a patient, during which the health care provider and the patient share information regarding pertinent health information, such as the patient's medical history, current symptoms, current medications, etc. Based on the discussion and on the health care provider's observations, the health care provider can diagnose the patient and can determine an appropriate treatment plan for the patient, which can include various therapies and/or medical prescriptions. Using a stationary or mobile computing device of the health care provider (sometimes referred to as a "practitioner interface device"), the health care provider can record (audio, video, or both audio and video) some or all of the session with the patient, and can upload the recording to a server system. As detailed below, the server system can perform various processing operations on the recording, and can provide the recording, a transcription of the recording, and related metadata to a client device operated by a suitable remote medical scribe (e.g., a professional who is trained on reviewing session recordings and generating a clinical note for a health care session, according to a format designated by a health care provider and/or an electronic health record (EHR) system used by the health care provider). After the clinical note has been entered into the EHR system, the health care provider can be notified by the server system (e.g., through the practitioner interface device or another device), and the health care provider can review and approve the clinical note. Some implementations of the platform described herein can more rapidly distribute session recordings to an authorized set of remote medical scribes that are equipped with an improved scribe interface at their respective computing device, thereby facilitating an efficient and accurate generation of clinical notes while allowing health care providers to spend more time treating patients and less time generating documentation.

Figure 1:
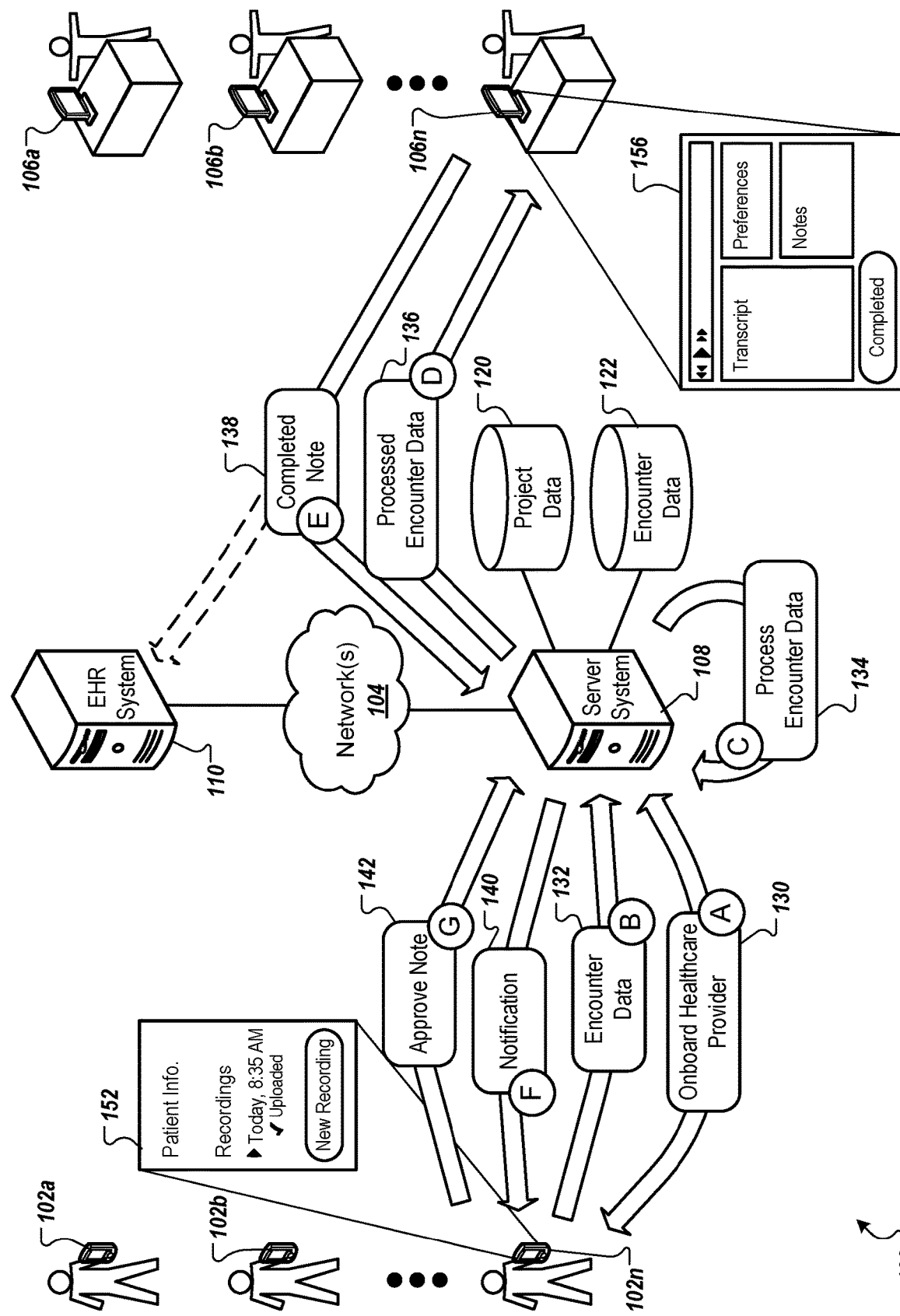
FIG. 1 is a diagram of an example system for facilitating the generation of clinical notes, in accordance with some embodiments.

FIG. 1 is a diagram of an example system 100 for facilitating the generation of clinical notes, as represented in example stages (A) to (G). Stages (A) to (G), for example, may occur in the illustrated sequence, a different sequence, and/or two or more stages (A) to (G) may be concurrent. In some examples, one or more stages (A) to (G) may be repeated multiple times when generating a clinical note.

In the present example, the system 100 includes multiple different mobile devices (e.g., practitioner interface devices 102a-n), each mobile device being operated by a respective health care provider. The practitioner interface devices 102a-n, for example, can include personal computers, laptop computers, smartphones, digital assistants, tablets, or other sorts of stationary or mobile computing devices that are configured to receive input from an operator (e.g., tactile input received through a controls presented on a touch screen and/or physical device controls, spoken input received through a microphone, activation commands received from a remote control device (such as a Bluetooth device), etc.), to present output to the operator (e.g., tactile, audio, and/or visual interfaces and notifications), to record a health care session conducted by the operator (e.g., with the recording including audio data, audiovisual data, etc.), and to communicate with other system components over communications network(s) 104. The system 100 in the present example also includes multiple different client devices (e.g., remote scribe devices 106a-n), each client device being operated by a respective medical scribe. The remote scribe devices 106a-n, for example, can include various mobile or stationary computing devices including, but not limited to a desktop computer, a laptop computer, a tablet computer, a digital assistant, a smartphone, or other suitable computing devices. Similar to the practitioner interface devices 102a-n, for example, the remote scribe devices 106a-n can be configured to receive input from an operator, to present output to the operator, and to communicate with other system components over communication network(s) 104. The communication network(s) 104, for example, can include one or more of a LAN (local area network), a WAN (wide area network), and/or the Internet.

The practitioner interface devices 102a-n and the remote scribe devices 106a-n in the present example can each communicate over network(s) 104 (e.g., sending data to and/or receiving data from) with a server system 108 and an electronic health record (EHR) system 110. Each of the server system 108 and the EHR system 110, for example, can include one or more computing servers (e.g., application servers, data servers, cloud servers, etc.). The server system 108, for example, can serve as an intermediary device between the practitioner interface devices 102a-n, the remote scribe devices 106a-n, and optionally, the EHR system 110. In some implementations, an application programming interface (API) of the server system 108 can use web sockets to send data to and receive data from the practitioner interface devices 102*a-n* and the remote scribe devices 106*a-n* in real time. For example, many features of the API can be shared by practitioner interface applications running on the practitioner interface devices 102*a-n* and by remote scribe interface applications running on the remote scribe devices 106*a-n*.

In the present example, the server system 108 can include and/or communicate with a project data store 120 and an encounter data store 122. Each of the data stores 120, 122, for example, can include data servers, file systems, and/or other suitable types of data storage devices or systems. The project data store 120, for example, can receive, store, and provide data related to the practitioner interface devices 102*a-n* and their respective operators (e.g., health care providers), data related to the remote scribe devices 106*a-n* and their respective operators (e.g., medical scribes), and organizational relationships between the health care providers and medical scribes. The encounter data store 122, for example, can receive, store, and provide data related to health care sessions (e.g., visits, encounters, etc.) between the health care providers and patients of the health care providers. Although a single EHR system (e.g., EHR system 110) is shown in the present example, in other examples, the server system 108 (and optionally, the practitioner interface devices 102*a-n* and the remote scribe devices 106*a-n*) can each communicate with multiple different EHR systems. For example, some health care providers may use different EHR systems than other health care providers.

During stage (A), an onboarding process 130 can occur, during which an account can be created for a health care provider on the server system 108, and the health care provider can receive login information and/or an application for accessing the server system. When setting up the account, for example, the health care provider can contact a representative of a clinical note generation platform who assists the provider with gathering and entering details for the account, or the health care provider can directly interact with an interface of the platform for setting up the account. In general, various preferences of the health care provider are recorded (e.g., EHR used by the provider, templates used in the EHR, note generation preferences, and other relevant preferences), various medical scribes are trained and/or selected for possible pairing with the health care provider, and the health care provider receives a mechanism (e.g., an application, a web link, etc.) for accessing the platform on their practitioner interface device.

Referring now to FIGS. 3A-E, example interfaces are shown for onboarding health care providers and medical scribes onto a platform for facilitating the generation of clinical notes. The example interfaces can be presented by an application (e.g., a web-based application and/or a locally executed application) provided by the server system 108. Example interface 300 (shown in FIG. 3A) shows a list of various projects that are maintained by the platform. In general, a project can represent a group of health care providers, and a group of medical scribes that have been approved for generating clinical notes for the group of health care providers. For example, a project can be associated with a medical facility (e.g., a hospital, a clinic, or another sort of medical facility) at which the group of health care providers conduct health care sessions with various patients, and with metadata such as an identifier of an electronic health record (EHR) system used by the health care providers, a billing model, a service level agreement, and other suitable metadata. In the present example, the interface 300 provides summary information for each project in the list of projects, including a number of health care providers that are associated with the project, a number of medical scribes that have been assigned to the project, a number of encounters (e.g., a health care session or visit between a health care provider and a patient) that have occurred over a specified time period (e.g., twenty-four hours, or another suitable time period), a number of encounters for which a clinical note is due within a specified time period (e.g., four hours, or another suitable time period), and a number of encounters for which a clinical note is overdue. In addition to using the interface 300 (and additional interfaces described in examples below) for onboarding health care providers and medical scribes to existing or newly created projects, the interfaces can be used for viewing statistics related to various projects and managing the projects.

To associate health care providers and medical scribes with a project, for example, a user can select a project from the list of projects (e.g., by interacting with a project view control), and in response can be presented with an interface that includes information related to the selected project. For example, interface 320 (shown in FIG. 3B) shows information associated with "Project A," including a workday identifier, an identity provider for the project, an electronic health record (EHR) system for the project, a division for the project, a billing type for the project, a region for the project, and a specialty for the project. In the present example, the interface 320 can also present various statistics for the project, such as a number of encounters for which data has been received from health care providers associated with the project, a number of encounters that are overdue (e.g., a designated completion time for a clinical note generation task is before a present time), an average audio duration of data files for the encounters, and a median amount of time between a clinical note generation task for the encounter having been assigned to a medical scribe and a completion time for the clinical note. Some or all of the project statistics can be presented in a graphical format, such as a bar graph in which, for each day of a selected week, a number of clinical notes for encounters having been completed on time is represented by a first bar, and a number of clinical notes for encounters having been completed overdue is represented by a second bar. In the present example, a list of health care providers that are associated with "Project A" is presented (e.g., health care providers that belong to an organization represented by the project), along with various statistics for each provider, such as a number of scheduled encounters for the provider during the present workday, a number of clinical note generation tasks that are available to be assigned to a medical scribe, a number of clinical note generation tasks that are due in a specified period of time (e.g., four hours, or another suitable time period), and a number of clinical note generation tasks that are overdue.

When onboarding a health care provider onto the platform for facilitating the generation of clinical notes, for example, a user can select a control to add a provider, and in response can be presented with an interface for specifying various preferences of the provider. Similarly, a user can select a health care provider from the list of health care providers (shown in FIG. 3B), and in response can be presented with the interface for viewing provider statistics and/or editing provider preferences. For example, interface 340 (shown in FIG. 3C) shows information associated with "Provider A1," including a project with which the health care provider is associated, a time zone for the provider, a service level agreement (SLA) for the provider, and an indication of whether audio files associated for encounters of the provider are to be transcribed. In the present example, the interface 340 can also present various statistics for the provider, such as a number of clinical note generation tasks for the provider that are currently available for assignment, a number of clinical note generation tasks that are to be completed as soon as possible (e.g., the tasks have been marked as "STAT" by the provider), a number of clinical note generation tasks that are currently overdue, a number of encounters that have been scheduled for the current day, and a number of clinical note generation tasks that are due in a specified period of time (e.g., four hours, or another suitable time period). The interface 340 in the present example can also be used to enter or edit note generation and template preferences of the provider for various portions of a clinical note, such as a history of present illness, a review of systems, allergies/medications/histories, a physical exam, an assessment and plan, and/or other portions of the clinical note.

A template preference, for example, can include specifying a named template of an electronic health record (EHR) system. A template, for example, can be a pre-filled (e.g., boilerplate) and pre-structured clinical note for the EHR, designed for a particular type of encounter (e.g., an annual medical exam, a review of systems for an adult, a review of systems for a child, etc.). For example, a particular EHR may have dozens or hundreds of available templates, whereas a health care provider may only use a small subset of the available templates. Template preferences of a health care provider can be stored, and later used for generating clinical notes for the provider. For example, one or more templates from the subset of available templates that are used by the health care provider can be automatically selected when a clinical note is to be generated, based on metadata associated with an encounter (e.g., scheduling information that indicates that an encounter is of a particular type). As another example, a medical scribe can manually select a template from the subset of available templates, based on information specified in a transcript of the encounter (e.g., a health care provider specifying that a particular template is to be used when generating a clinical note for the encounter).

Figure 3A:
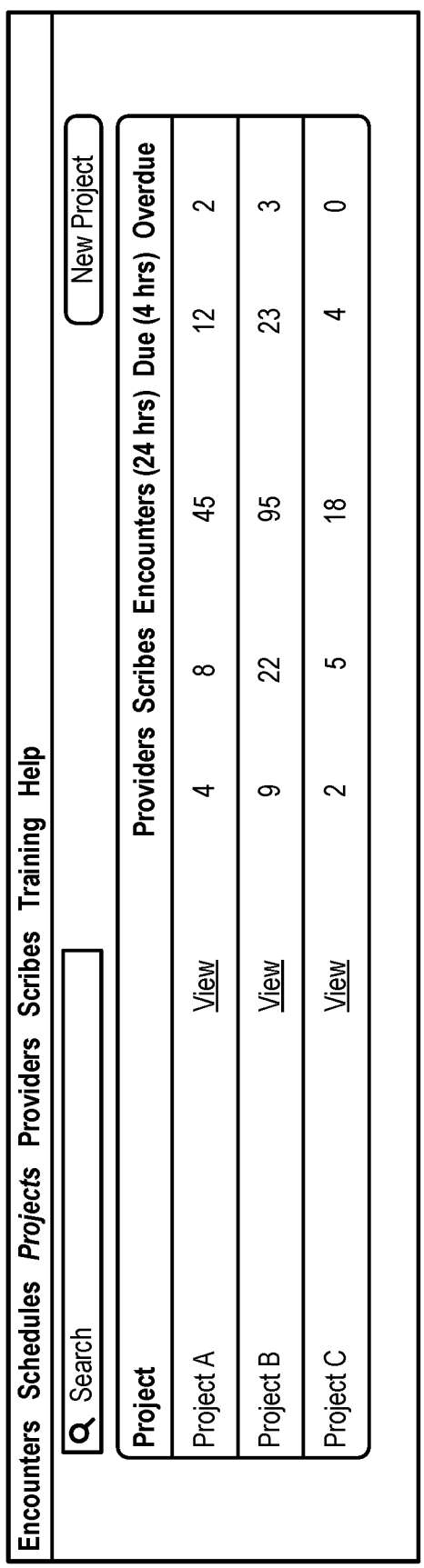
Figure 3D:
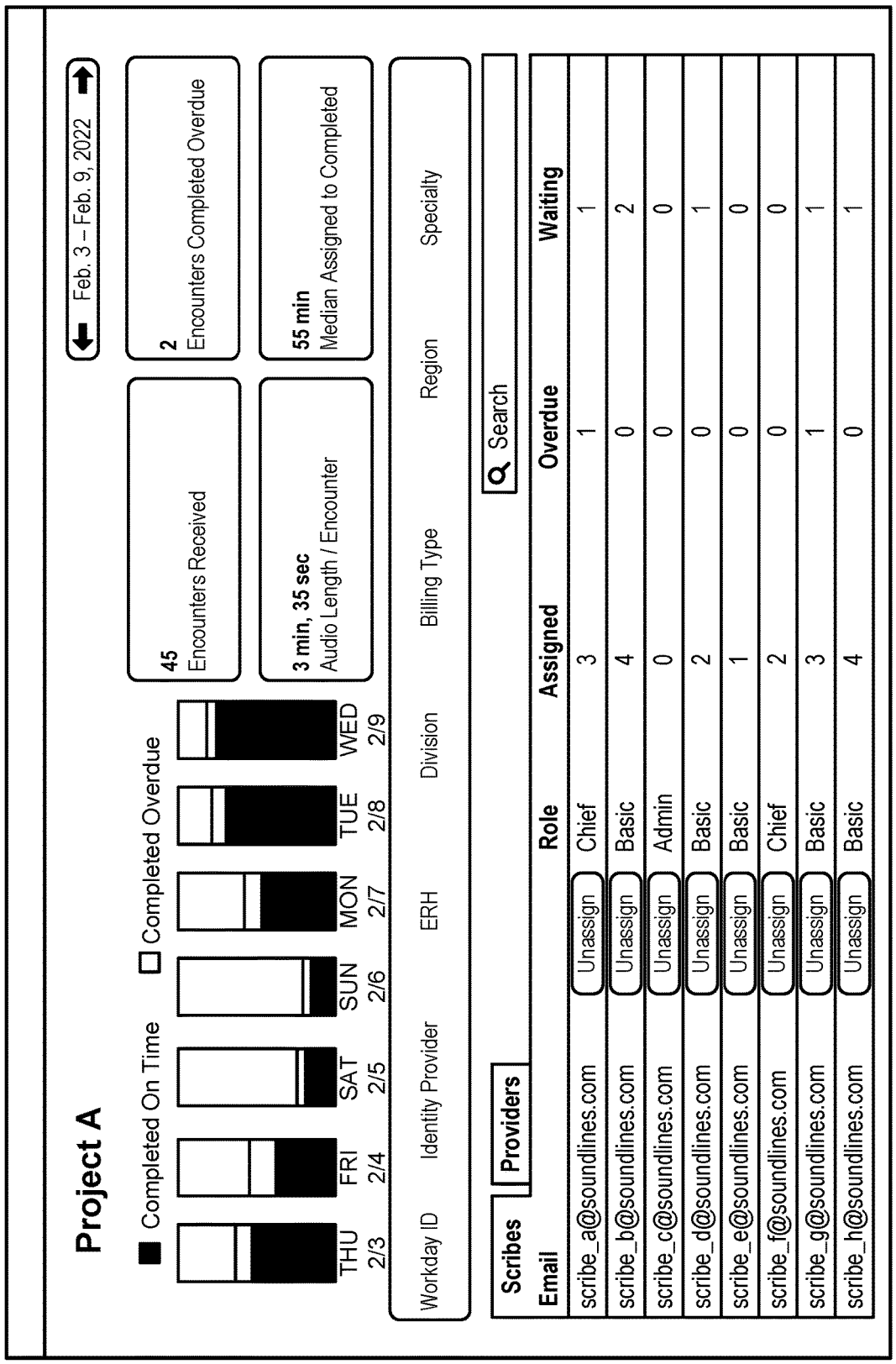

Referring to FIG. 3D, example interface 360 is shown for associating (and disassociating) medical scribes with a project. Similar to interface 320 (shown in FIG. 3B), for example, the interface 360 can present information and statistics related to a selected project. For example, a user can switch between views of a health care provider list for a project (interface 320, shown in FIG. 3B), and a medical scribe list for a project (interface 360, shown in FIG. 3D), by interacting with a control (e.g., a tab control or another suitable control) that facilitates switching between the lists. In the present example, a list of medical scribes that are associated with "Project A" is presented (e.g., medical scribes that have been approved to work on clinical notes for encounters of health care providers that are associated with the project), along with various statistics for each scribe, such as a role (e.g., chief or supervising, basic, administrator, or another sort of role), a number of clinical note generation tasks that are currently assigned to the scribe, a number of clinical note generation tasks that are currently overdue, and a number of clinical note generation tasks that are currently waiting (e.g., the scribe is waiting for additional encounter information from a health care provider before completing a note). In general, a medical scribe can be approved to work on clinical notes for various different projects (e.g., groups of health care providers), whereas a health care provider is generally associated with a single project.

Referring to FIG. 3E, example interface 380 is shown for maintaining a schedule of encounters for a health care provider. For example, a user can manually load a provider's schedule, including dates and times of planned sessions with various patients, in advance of the sessions occurring. As another example, the platform for facilitating the generation of clinical notes can be integrated with an electronic health record (EHR) system used by a provider, and the provider's schedule can be automatically be retrieved by the platform from the EHR system.

Referring again to FIG. 1, data collected during the onboarding process 130 can be stored by the server system 108 using the project data store 120. After the onboarding process 130 for a healthcare provider has occurred, for example, the provider can access the clinical note generation platform. In the present example, a health care provider can use practitioner interface device 102n to access an application (e.g., a native application, a web-based application, or another sort of application) that can receive schedule and patient information from the server system 108, and can present the information to the health care provider through a practitioner interface 152. For example, the health care provider can select a patient from a patient list presented by the practitioner interface 152 when conducting a health care session with the patient, and the practitioner interface 152 can present information related to the patent (e.g., patient name, patient identifier, date of birth, and other relevant information) to the provider. As another example, the health care provider can use the practitioner interface 152 to enter patient information. During and/or after conducting the session, for example, the health care provider can interact with the practitioner interface 152 to initiate the recording of one or more audio files that pertain to the session, on the practitioner interface device 102n. In some implementations, a practitioner interface used by a health care provider can include a control for indicating a type of task to be performed for an encounter. For example, the type of task can be a generation of a clinical note to be uploaded to an electronic health record (EHR) system, an order of a medication and/or medical service (e.g., an x-ray, a blood sample, or another sort of service), a referral to be provided to another health care provider, or another sort of task.

During stage (B), encounter data 132 can be transferred from the practitioner interface device 102n to the server system 108. The encounter data 132, for example, can include the one or more audio files that pertain to the health care session conducted by the health care provider, and can include additional metadata related to the session (e.g., time of session, place of session, an indication of whether a clinical note for the encounter is to be generated without delay (STAT) or within a normal timeframe, etc.), and/or additional metadata related to the patient and/or the provider (e.g., names, identifiers, etc.). In some implementations, encounter data can be transferred from a practitioner interface device to a server system without receiving specific input from a health care provider to initiate the transfer. For example, after the health care provider ends a session recording, the practitioner interface device 102n can automatically begin transferring an audio file to the server system 108. Resumable upload techniques can be used to transfer the audio file, for example, such that a file transfer can resume from a last point of transfer (rather that from the beginning), if a transfer is interrupted at any point due to poor network connection. After the file has been received by the server system 108, for example, the server system can notify the practitioner interface device 102n that the file has been received. In response to the notification of successful upload, for example, the practitioner interface application can automatically delete the uploaded audio file from local storage of the practitioner interface device 102*n*, thus freeing up storage resources. If a healthcare provider later requests to review the audio file through the practitioner interface application, for example, the file can be streamed by the server system 108 to the practitioner interface device 102*n*.

Figure 2:
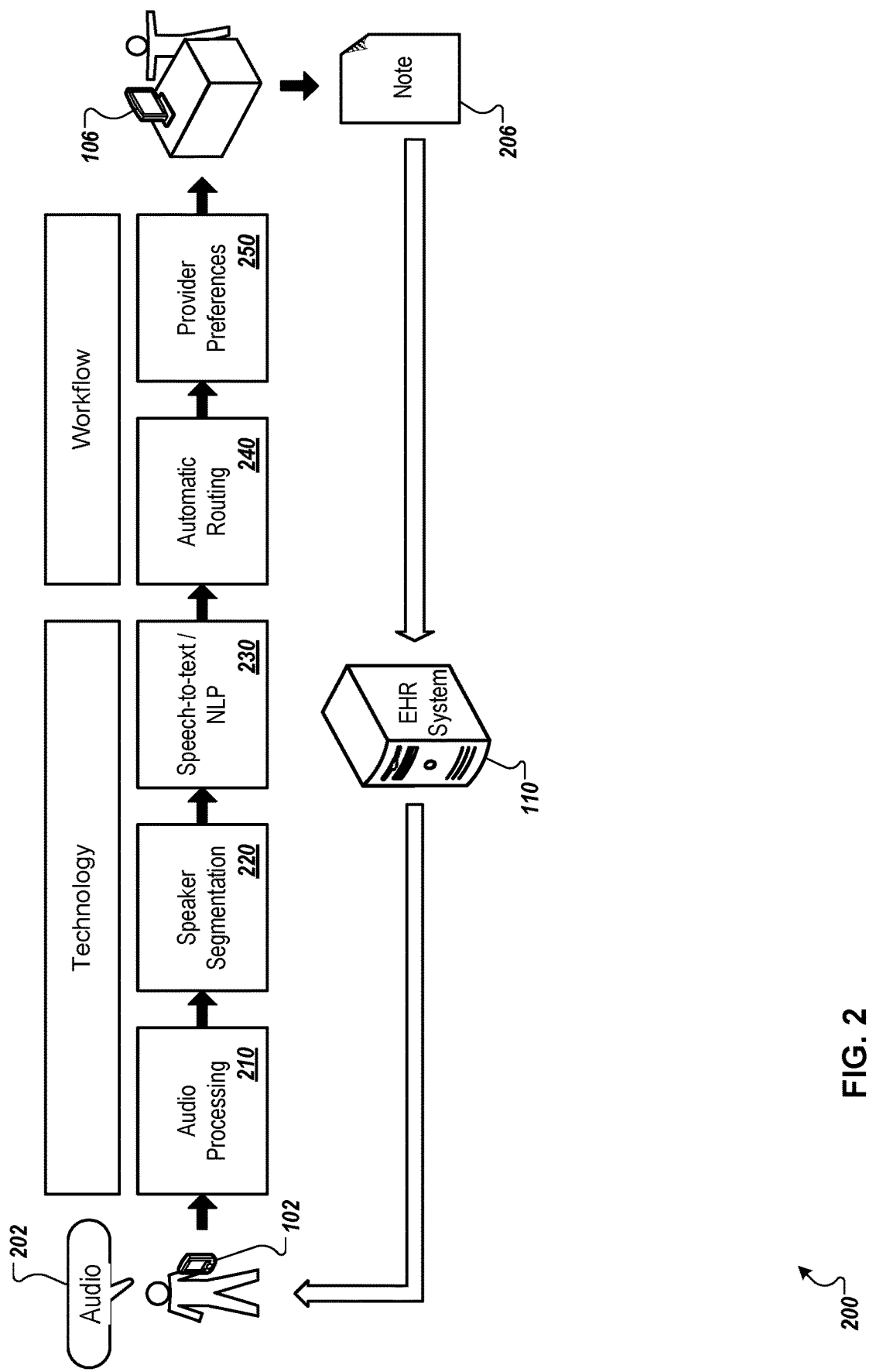
FIG. 2 is a diagram that illustrates example technology and workflow features for facilitating the generation of clinical notes.

During stage (C), a process 134 for processing the encounter data 132 can occur, during which various audio processing, speaker segmentation, and speech-to-text techniques can be performed on the one or more audio files included in the encounter data. Referring now to FIG. 2, for example, a diagram 200 illustrates example technology and workflow features for facilitating the generation of clinical notes. As shown in FIG. 2, for example, practitioner interface device 102 (e.g., any of practitioner interface devices 102*a-n*, shown in FIG. 1) can be used to record audio data 202 during or after a health care session between a health care provider and a patient (e.g., one or more audio files included in the encounter data 132, shown in FIG. 1). In some examples, the audio data 202 can be or can include a lossless, uncompressed audio file (e.g., 16,000 Hz), or another audio format that is suitable for speech-to-text operations.

The audio data 202 can be provided to an audio processing engine 210, which can perform basic checks to ensure that the audio data is correctly formatted and does not include computer viruses. After performing the basic checks, for example, the audio processing engine 210 can perform noise filtering and selective silence reduction on the audio data 202. A selective silence reduction operation, for example, can include detecting voice activity in the audio data (e.g., based on the frequency of human voices), and eliminating portions of the audio data in which speaking does not occur. A trimmed audio data can be run through a noise filtering operation to minimize background noise that may be present in the audio. By trimming and noise filtering the audio data 202, for example, downstream processes can be more efficiently and accurately performed (e.g., improving a word error rate in an automatically generated transcript), and data storage can be conserved.

Processed audio data 202 can be provided to a speaker segmentation engine 220, which can identify segments of the audio according to speaker. For example, the speaker segmentation engine 220 can provide the processed audio data 202 to a machine learning model that is trained to recognize segments of the audio that are spoken by a particular health care provider, and segments that are spoken by other individuals. Training the machine learning model to recognize audio segments of the particular health care provider, for example, can occur as part of an onboarding process for the health care provider. For example, audio data of the health care provider speaking can be collected during the onboarding process to acquire an acoustic model of the health care provider's voice, which can be used to improve the performance of the machine learning model during production. As another example, audio data of an initial encounter conducted by the health care provider can be manually segmented, labeled, and provided to the machine learning model for training, and processed audio data for subsequent encounters can be provided to the machine learning model for automatic segmentation.

The processed and segmented audio data 202 can be provided to a speech-to-text/natural language processing (NLP) engine 230, which can generate a transcript for the session between the health care provider and the patient, with each segment of spoken audio being labeled by speaker.

After the session transcript has been generated, for example, natural language processing techniques can be used to identify, and to denote (e.g., mark, underline, highlight, etc.) key terms (e.g., medical terms, terms used in diagnoses, names of medications, and other key terms) that are present in the transcript. A generated transcript with denoted key terms can be presented in a note generation interface, for example, to facilitate clinical note generation tasks. Optionally, the generated transcript with identified key terms can be used to automatically populate at least a portion of an electronic health record (EHR) note. For example, key terms can be mapped to portions of a template for the EHR note, and a completed (or partially completed) note can be automatically prepared for review by a scribe and/or health care provider.

The audio processing engine 210, the speaker segmentation engine 220, and the speech-to-text/NLP engine 230, for example, can each include software and/or hardware components of the server system 108 (shown in FIG. 1). After the process 134 for processing the encounter data 132 is complete, for example, a priority level for generating a clinical note (and/or performing another sort of task for the encounter) for the encounter can be determined (e.g., based on a "STAT" indication by the health care provider, service agreements that are in place for the provider, and/or a type of task indicated by the health care provider), and metadata associated with the encounter data 132, the generated transcript, one or more audio files corresponding to the processed audio data 202 (and optionally, the original audio data) can be stored by the server system 108 using the encounter data store 122.

Referring again to FIG. 1, during stage (D), processed encounter data 136 can be provided to a suitable medical scribe. For example, the processed encounter data 136 (e.g., including associated metadata, one or more processed audio files, and a transcript based on the audio files) can be provided by the server system 108 to remote scribe device 106*n* of a respective medical scribe. In the present example, the processed audio file(s), the transcript, and preferences of the health care provider that submitted the encounter data 132 can be presented to the medical scribe through a remote scribe interface 156 (e.g., an application interface, a web-based interface, etc.) presented by remote scribe device 106*n*. Referring again to FIG. 2, for example, an automatic routing engine 240 can use various metadata to route notifications of available encounters (and optionally, to automatically assign tasks for encounters) to medical scribes that have been approved to work on tasks for the available encounters. After a task has been assigned for an encounter, for example, a provider preferences engine 250 can retrieve the preferences of the health care provider that submitted the encounter data (e.g., preferences that have previously been submitted through the interface 340, shown in FIG. 3C), for presentation at remote scribe device 106 (e.g., any of remote scribe devices 106*a-n*, shown in FIG. 1), along with the generated transcript and the processed audio file(s). The automatic routing engine 240 and the provider preferences engine 250, for example, can each include software and/or hardware components of the server system 108 (shown in FIG. 1). After the processed encounter data 136 has been provided to a suitable medical scribe, for example, the scribe can generate a clinical note 206 for the encounter, which can be uploaded to the electronic health record (EHR) system 110 (also shown in FIG. 1). Notification of the clinical note 206 having been uploaded to the EHR system 110, for example, can be provided to the practitioner interface device 102, for presentation to the health care provider that submitted the encounter data.

In some implementations, a task type indicated by a health care provider can be used for routing a task to a suitable medical scribe or pool of scribes. For example, clinical note generation tasks can be routed to remote scribe devices of medical scribes that are approved to generate clinical notes for the health care provider, and who employ remote scribe interfaces that are configured to facilitate the generation of such notes. As another example, order generation tasks can be routed to remote scribe devices of medical scribes that specialize in processing such orders, and who employ remote scribe interfaces that are configured to process the orders. As another example, referral tasks can be routed to remote scribe devices of medical scribes that specialize in processing referrals, and who employ remote scribe interfaces that are configured to process referrals. In some implementations, a task type indicated by a health care provider can be used as a factor in prioritizing the task. For example, order generation tasks can be assigned a high priority level, as such tasks tend to be more time-sensitive than generating clinical notes. As another example, referral tasks can be assigned a low priority level, as such tasks tend to be less time-sensitive than generating clinical notes.

In some implementations, a medical scribe can be manually assigned to a task for generating a clinical note for an encounter. For example, a manager (e.g., chief scribe who manages a team of scribes) can receive notifications of processed encounter data for various relevant encounters (e.g., encounter data for encounters submitted by health care providers that have been mapped to the chief's team of scribes) being available from the server system 108. The chief scribe can review details of the various encounters and current task queues of the medical scribes on the team, and can manually match tasks for generating encounter notes to suitable scribes.

In some implementations, a medical scribe can self-assign a task for generating a clinical note for an encounter. For example, each medical scribe that has been mapped to the health care provider that submitted the encounter data 132 using the practitioner interface device 102n (e.g., medical scribes that have been approved for generating clinical notes for the health care provider) can receive a notification of the processed encounter data 136 being available from the server system 108, through the remote scribe interface 156. A medical scribe can choose to self-assign the task for generating the clinical note for the encounter, for example, and the task can be added to a task queue for the medical scribe. In some examples, a medical scribe can be assigned to multiple ongoing tasks. If the medical scribe were to be unable to complete a current task (e.g., additional information has been requested from the health care provider that submitted encounter data for the task, and the current task has a "Waiting" status), for example, the scribe can self-assign an additional task, and can work on the additional task while waiting for the additional information to arrive for the other task.

In some implementations, a task for generating a clinical note for an encounter can be automatically assigned to a medical scribe. For example, the server system 108 can select, from a group of medical scribes that have been approved to generate clinical notes for the health care provider that submitted the encounter data, a particular scribe to complete the task for generating the clinical note. In general, an automatic assignment of a task can be based on various factors, including a service level of the task (e.g., a due date/time for completing the task), a priority of the task (e.g., whether the a task for completing a clinical note for an encounter has been marked as "STAT" by a health care provider, or whether the task has normal priority), an amount of time remaining in a medical scribe's shift, a current task queue for the medical scribe, an average amount of time the medical scribe takes to complete a task, and/or a task complexity. The various factors can be weighed and balanced for each task and each medical scribe, to identify a preferred scribe for performing the task.

In some implementations, to determine a task complexity, a complexity scoring technique can be used that can include determining complexity scores for various task factors, weighting the complexity scores for the task factors, and determining an overall task complexity score based on the weighted complexity scores for the task factors. Task factors, for example, can include an audio factor, a session flow factor, a specialty factor, an electronic health record (EHR) factor, a care setting factor, a provider preference factor, and other suitable factors. The audio factor, for example, can be based on characteristics of audio files for an encounter (e.g., with tasks for working with relatively long files being given higher complexity scores than for short files, and with tasks for working with files having a relatively large amount of background noise being given higher complexity scores than for files having a small amount of background noise). The session flow factor, for example, can be based on a number of speakers included in the audio for the encounter (e.g., with tasks for working with conversational audio being given higher complexity scores than tasks for working with regular dictation). The specialty factor, for example, can be based on a qualitative assessment of the complexity of each specialty (e.g., orthopedics, internal medicine, etc.), which has been previously determined and stored in a dictionary with key-value pairs. For example, generating clinical notes for encounters for some specialties may be more complex than generating clinical notes for encounters for other specialties. Similarly, the EHR factor can be based on a qualitative assessment of the complexity of working with (e.g., entering notes in) a particular EHR, which has previously been determined and stored in a dictionary with key-value pairs, for example. Similarly, the care setting factor can be based on a qualitative assessment of the complexity of generating clinical notes for a particular care setting (e.g., urgent care, ambulatory, etc.), which has previously been determined and stored in a dictionary with key-value pairs, for example. Similarly, the provider preference factor can be based on a qualitative assessment of the complexity of generating a clinical note according to the preferences that have been specified for a particular health care provider, which has been previously determined (e.g., based on a number of templates referenced in the preferences, a word count of the preferences, and/or other suitable factors) and stored in a dictionary with key-value pairs, for example. After scores for the various task factors have been determined, for example, the scores for the factors can be used to determine an overall complexity score for the task. For example, determining the overall complexity score for the task can include weighting the factors, and performing a computation (e.g., a weighted average, a weighted sum, or another suitable computation) using the weighted factors and associated scores for the factors.

After an overall task complexity score has been determined for a task, the score can be used as a factor in assigning the task to a particular medical scribe, and/or as a factor in determining whether portions of a clinical note for the task may be automatically generated (e.g., with tasks having relatively low complexity scores generally being suitable candidates for automatic note generation). For example, some medical scribes may be specifically trained to work on complex note generation tasks, whereas others may not be trained to work on such tasks. When assigning a complex task (e.g., a task with an overall complexity score that meets or exceeds a threshold value) to a medical scribe, for example, the server system 108 can access the project data source 120, identify a subset of the pool of scribes that have been approved to generate clinical notes for the health care provider and that can be assigned to complex tasks. A suitable medical scribe can be selected from the subset of the pool of scribes and automatically assigned to the task based on one or more other factors, such as a type of task, a due date/time for completing the task, a priority of the task (e.g., whether the a task for completing a clinical note for an encounter has been marked as "STAT" by a health care provider, or whether the task has normal priority), an amount of time remaining in a medical scribe's shift, a current task queue for the medical scribe, and/or a predicted amount of time the medical scribe takes to complete the task (e.g., by multiplying an average amount of time the scribe takes to process a minute of encounter audio data by a total duration of audio files associated with the encounter).

After a task for generating a clinical note has been assigned to a medical scribe (e.g., the task has been manually assigned, self-assigned, or automatically assigned) and the processed encounter data 136 (shown in FIG. 1) has been provided to the medical scribe through the remote scribe interface 156 (also shown in FIG. 1), for example, the scribe can generate a clinical note 206 (shown in FIG. 2) for the encounter. When generating the clinical note 206, for example, the medical scribe can interact with controls of the remote scribe interface 156 to play the one or more processed audio files of the encounter, to reference the transcript of the audio file(s), and to reference the preferences and templates of the health care provider that submitted the encounter data to the server system 108. In general, a clinical note is not a verbatim transcription of what was said during the encounter, but a synthesis of the clinical information conveyed during the encounter (e.g., medical history, observations, diagnosis, treatment plan, etc.), formatted according to preferences and templates of the health care provider. For example, a portion of the remote scribe interface 156 can be used by the medical scribe for working on the clinical note, with easy reference to source information and instructions for generating the note being provided through other portions of the interface.

Referring again to FIG. 1, during stage (E), a completed clinical note 138 can be provided for storage in the health care provider's electronic health record (EHR) system. For example, after the note 138 has been completed by a medical scribe using the remote scribe device 106*n*, the medical scribe can interact with controls provided by the remote scribe interface 156 to indicate that the note is complete, and the remote scribe device 106*n* can provide the completed note to the server system 108. In the present example, the server system 108 can then transfer the received completed clinical note 138 to the EHR system 110. As another example, the medical scribe can directly access the EHR system 110, can upload the completed clinical note 138 to the system, and can then use the remote scribe interface 156 to provide a notification to the server system 108 that the upload of the clinical note 138 has been completed. In response to uploading (or receiving a notification that indicates upload of the completed clinical note 138, for example, the server system 108 can update a status of the corresponding encounter (e.g., marking the clinical note for the encounter as being completed and/or uploaded).

During stage (F), a notification 140 that a clinical note for an encounter has been completed and uploaded to the health care provider's electronic health record (EHR) system can be provided to the health care provider. For example, the server system 108 can provide the notification 140 to the practitioner interface device 102*n* of the health care provider that the completed clinical note 138 has been uploaded to the EHR system 110. After receiving the notification 140, for example, the practitioner interface device 102*n* can present the notification 140 to the health care provider through the practitioner interface 152.

During stage (G), the health care provider can provide an indication that the completed clinical note for the encounter has been reviewed and approved. If the completed clinical note 138 has been received by the server system 108, for example, the health care provider can use the practitioner interface device 102*n* to access the note from the server system and review the note. As another example, if the completed clinical note 138 has been uploaded to the electronic health record (EHR) system 110, the health care provider can use the practitioner interface device 102*n* (or another device) to access the note from the EHR system 100 and review the note. After reviewing the completed clinical note 138 for the encounter, for example, the health care provider can interact with the practitioner interface 152 to indicate that the note has been approved, and a corresponding approval notification 142 can be provided by the practitioner interface device 102*n* to the server system 108. In response to receiving the approval notification 142, for example, the server system 108 can update a status of the corresponding encounter task (e.g., marking the clinical note for the encounter as being approved).

Referring now to FIGS. 4A-E, example interfaces are shown for facilitating the generation of clinical notes. The example interfaces can be presented by an application (e.g., a web-based application and/or a locally executed application) running on a remote scribe device and in communication with a server system (e.g., server system 108, shown in FIG. 1). Similar to remote scribe interface 156, for example, the example interfaces shown in FIGS. 4A-E can be presented to a medical scribe by any of the remote scribe devices 106*a-n* (shown in FIG. 1). Example interface 400 (shown in FIG. 4A) can be used in implementations in which tasks for generating clinical notes are manually assigned to the medical scribe and/or self-assigned by the medical scribe. In the present example, interface 400 shows a list of available note generation tasks 402 (e.g., "Available Encounters") that have not yet been assigned to a medical scribe, and a list of note generation tasks 404 that have been assigned to medical scribes and have not yet been completed and approved. The list of available note generation tasks 402 that have not yet been assigned to a medical scribe, for example, can be populated using data provided by the encounter data store 122 and the project data store 120. For example, as new encounter data 132 is received and processed by the server system 108, a task for completing a clinical note can be generated and prioritized, and can be added to the list of available note generation tasks 402, if the task is for an encounter of a health care provider for whom the medical scribe has been authorized to generate notes. In some implementations, a list of available note generation tasks can be sorted in order of when the tasks become available. For example, when a new note generation task becomes available, it can be added to the end of the list 402. In some implementations, a list of available note generation tasks can be sorted according to priority level. For example, when a new note generation tasks becomes available, it can be inserted into a position of the list 402 according to its priority (e.g., with tasks for generating clinical notes for encounters marked by health care providers as being "STAT," tasks for providers having a service agreement that prioritizes such tasks, complex tasks, particular types of tasks, and other prioritized tasks being inserted at or near the top of the list). In the present example, various information can be presented for each task in the list of available note generation tasks 402, such as a health care provider who conducted the encounter, the patient, a number and duration of audio files for the encounter, and a date/time at which the clinical note for the encounter is due. Each task in the list of available note generation tasks 402 can also be associated with a control that initiates the assignment of the task to an operator of the interface 400, or to a different medical scribe.

After a task in the list of available note generation tasks 402 has been assigned to a medical scribe, for example, the task can be removed from the list 402 and can be added to the list of note generation tasks 404 that have been assigned to medical scribes and have not yet been completed and approved. The list of note generation tasks 404 that have been assigned but not yet completed, for example, can be populated using data provided by the encounter data store 122 and the project data store 120. In the present example, various information can be presented for each task in the list of note generation tasks 404, such as a time of last update to the task (e.g., when the task was added to the list, when a status change occurred, and/or when additional data was received for the task), a project for the task, a provider who conducted the encounter, the patient, a number and duration of audio files for the encounter, a date/time at which the health care session was scheduled, a date/time at which the clinical note for the encounter is due, a current status of the task (e.g., assigned, working, waiting, completed and under review, or another suitable status), and a medical scribe to which the task has been assigned. The interface 400 in the present example can also include various controls for searching, filtering, and/or sorting tasks in the list 404, including a control 406 for switching between a view of all tasks in the list, and a view of tasks that have been assigned to a medical scribe who is using the interface 400. In some implementations, a control for switching between views can be provided on an interface operated by a manager or administrator (e.g., a chief medical scribe), and may not be provided on an interface operated by a production worker (e.g., a basic medical scribe). For example, a basic medical scribe can be presented with a view that only lists tasks that have been assigned to the scribe or tasks that can be self-assigned by the scribe. As another example, managers, administrators, and production workers can each be provided with interfaces having controls for switching between views of all assigned tasks or individually assigned tasks.

In some implementations, a task list interface can also present various statistics for tasks and encounters represented by the interface. For example, the interface 400 can be operated by a manager or administrator (e.g., a chief medical scribe), and statistics can be presented for tasks and encounters that pertain to projects being managed. In the present example, multiple projects (e.g., Project A and Project B) are being managed, and for the multiple projects, statistics such as a number of encounters scheduled, a number of encounter tasks received, a number of encounter tasks completed, and a number of online medical scribes that have been approved to work on the tasks can be presented to the manager. In general, the statistics and each of the lists 402, 404 can be dynamically updated as data in the project data store 120 and/or the encounter data store 122 changes over time. For example, as new tasks become available, the tasks can be inserted into the list of available note generation tasks 402 at appropriate locations, and the number of encounter tasks received can be incremented. When a new task is assigned, for example, the task can be removed from the list 402 and added to the list of note generation tasks 404 that have been assigned but not yet completed, with a status of "Assigned." If a task priority changes (e.g., a task with a high complexity score remains in a task queue or a list of available tasks for more than a threshold amount of time), a position in the list 404 can be adjusted toward the top of the list and/or the task can be re-assigned. When a medical scribe begins working on the task, for example, the task's status can be updated to "Working." If additional information has been requested from the health care provider, for example, the task's status can be updated to "Waiting." When the clinical note for the task has been uploaded and is waiting for review, the task's status can again be updated to "Uploaded," for example. When the health care provider has reviewed and approved the clinical note, for example, the task can be removed from the list 404, and the number of completed encounters can be incremented. Real-time interface updating features can be implemented by the server system 108, for example, through a suitable API.

In some implementations, a task list interface can present notifications when new tasks and encounters become available, and/or when additional data for pending tasks and encounters becomes available. For example, a notification icon 410 (e.g., a visual icon in the upper-right hand corner of interface 400) can be presented or can visually change (e.g., through an animation, a different appearance, etc.) when new information is available. In response to a user interaction with (e.g., clicking, hovering over, etc.) the notification icon 410, for example, a notification display 412 can be presented (e.g., as a pop-up over the interface 400, adjacent to the interface 400, or another suitable type of presentation). In the present example, the notification display 412 includes a list of notifications for tasks and encounters that are received during a current shift. The list of notifications, for example, can be ordered by time of receipt (optionally included in the notification), with more recent notifications being presented at the top of the list, and less recent notifications being presented at the bottom of the list. In the present example, the list of notifications includes a notification that new audio is available for an encounter by Provider A1, a notification that the encounter by Provider A1 is overdue, and a notification that a new encounter is available from Provider B2. In response to a user selection of any of the notifications in the list of notifications, for example, the interface 400 can be updated to present additional details for a task or encounter that corresponds to the selected notification (e.g., example interface 440, shown in FIG. 4C).

In some implementations, a task list interface can present a list of clinical note generation tasks that have automatically assigned. For example, interface 420 (shown in FIG. 4B) can include elements similar to that of interface 400 (shown in FIG. 4A), and can be used in implementations in which some or all tasks for generating clinical notes are automatically assigned to medical scribes. In the present example, a list of note generation tasks 424 that have been assigned but not yet completed can be presented for tasks that have been assigned to a medical scribe that is currently using the interface 420 (e.g., Scribe A), per a selection of control 426 (similar to control 406, shown in FIG. 4A) for switching between task list views. As new tasks are automatically assigned to the medical scribe (e.g., by the server system 108), the tasks can be added to an appropriate position in the list 424 (e.g., based on task priority). In some implementations, manual and/or self-assignment of tasks can be disabled when one or more tasks remain in a queue of medical scribe's queue of tasks to be completed, and the medical scribe is not currently waiting for additional encounter information or note approval. In the present example, since "Scribe A" is still working on the task in the list 424, a list of available note generation tasks 422 (e.g., "Available Encounters") can be disabled (or hidden), until such time that the task in the list 242 is completed (or the medical scribe is waiting for additional information/approval). At such time, for example, the list of available note generation tasks 422 can be enabled (or shown), and the medical scribe can be permitted to self-assign one of the tasks.

Figure 4B:
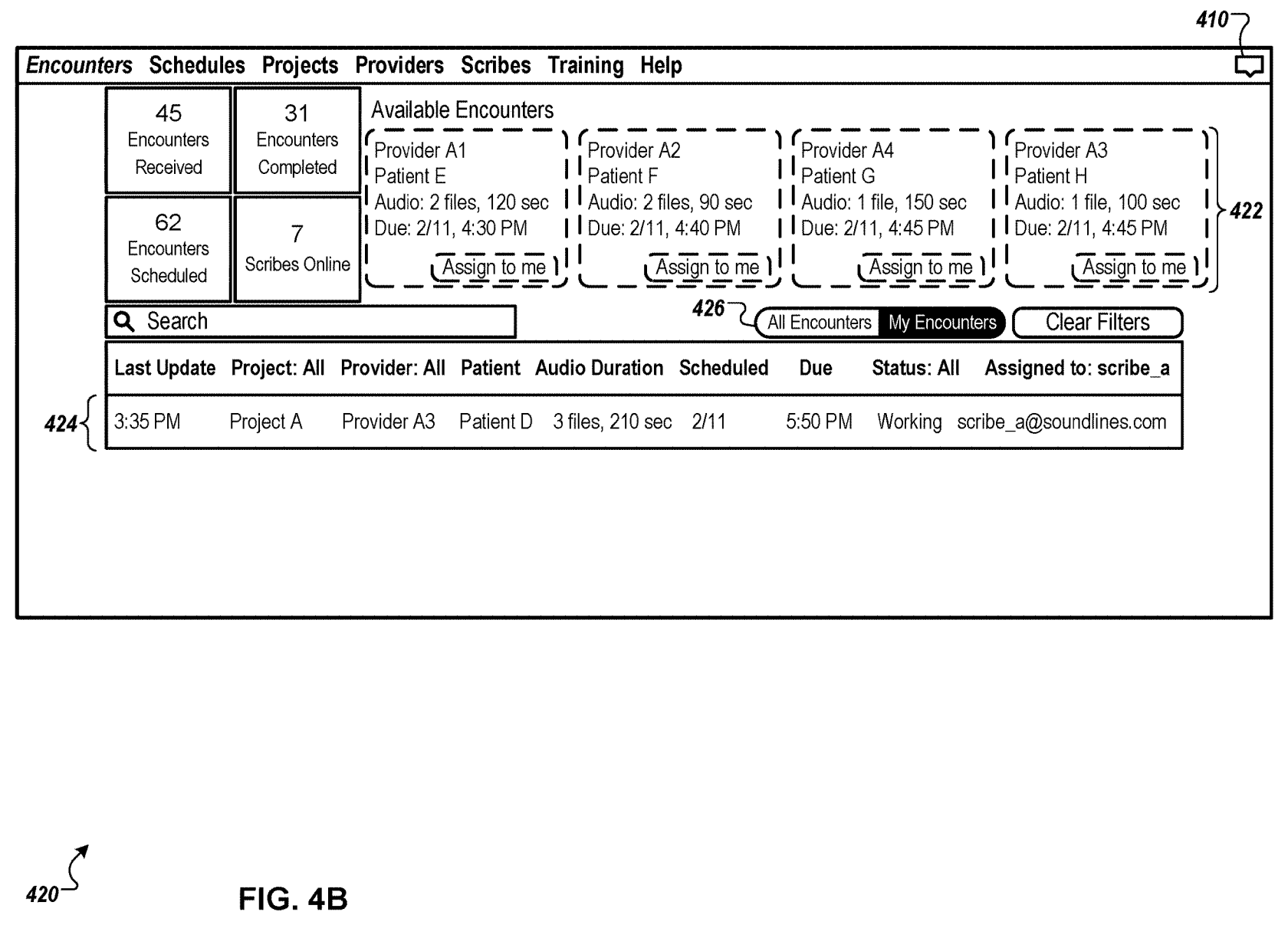
Figure 4C:
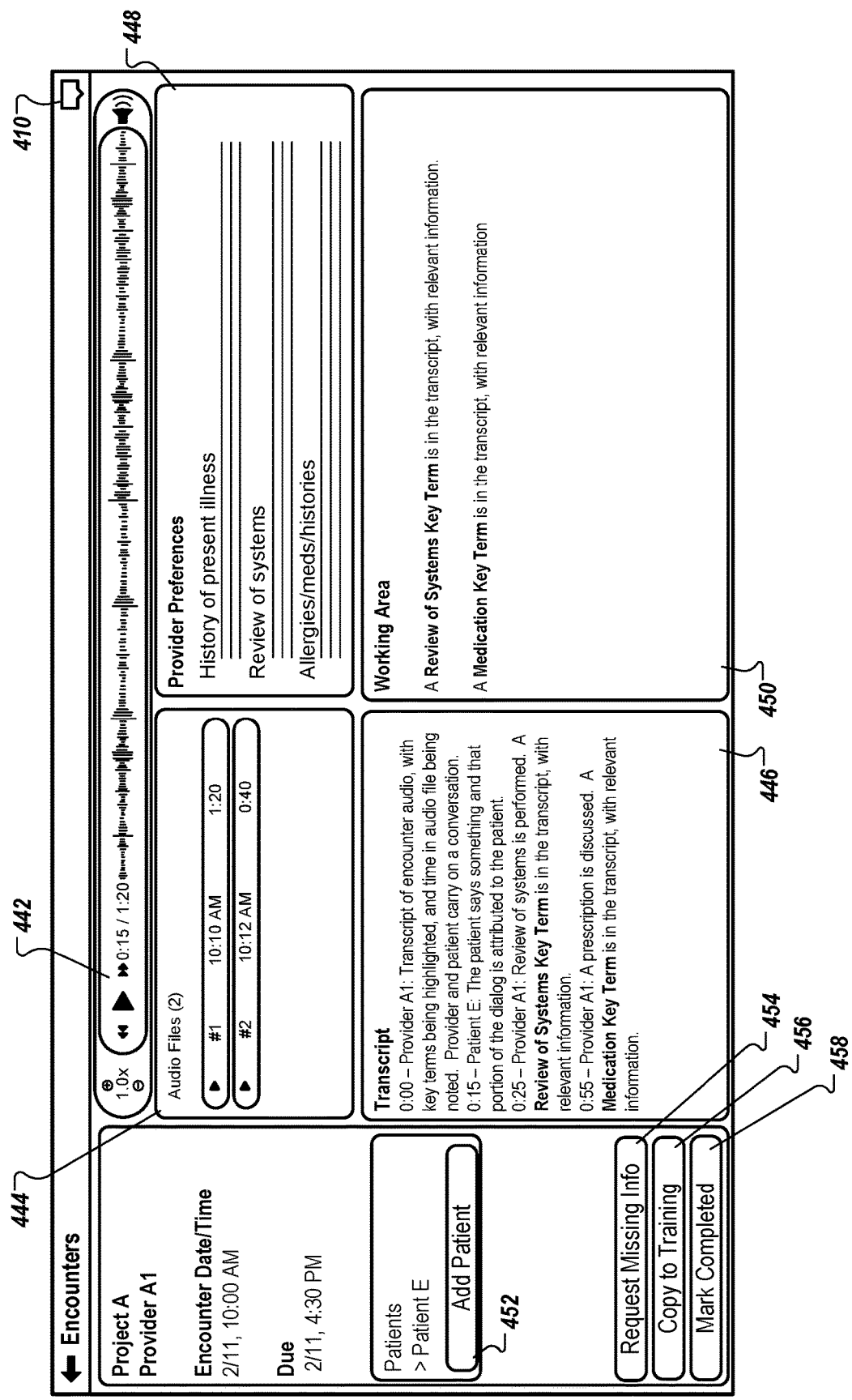

Referring now to FIG. 4C, example interface 440 is shown for working on the generation of a clinical note. In implementations in which tasks can be manually assigned to or self-assigned by medical scribes, for example, selection of a task from a list of clinical note generation tasks can cause the presentation of interface 440. In implementations in which tasks are automatically assigned to medical scribes, for example, a task queue can be maintained for a medical scribe in the background, and interface 440 can serve as a landing page for the scribe (rather than interfaces 400, 420). In the present example, the interface 440 includes a media presentation control 442, a media selection control 444, a transcript presentation control 446, a provider preference presentation control 448, a working area 450, an add patient control 452, a request missing information control 454, a copy to training control 456, and a mark completed control 458. The interface 440 in the present example also presents additional information related to the encounter for which a clinical note is to be generated, such as a project for the encounter, a health care provider that conducted the encounter, a date/time of the encounter, and a due date/time for the encounter.

In use, a medical scribe can select a media file (e.g., an audio file, an audiovisual file, etc.) represented in the media selection control 444, and begin playing the media file using the media presentation control 442. The media presentation control 442, for example, can include controls for specifying a playback speed of the file, a control to specify a preferred volume for playback of the file, various file navigation controls (e.g., play, fast forward, fast reverse, etc.), and various file information presentation controls, such as controls that indicate a current time of file playback, a total file duration, and a wave form of the file. To jump to any point in the file playback, for example, the medical scribe can select the point in a seek bar.

The transcript presentation control 446, for example, can present a transcript of the selected file, and can be updated if the medical scribe selects a different file. As another example, the transcript presentation control 446 can present transcripts of all media files represented in the media selection control, in order of the files. In the present example, the transcript presented in the transcript presentation control 446 can be segmented by speaker (e.g., health care provider and patient), with each speaker being labeled in the transcript, and a time within the file at which each speaker speaks also being labeled in the transcript. In some implementations, key terms (e.g., based on a language model) can be automatically highlighted in the transcript. The automatic highlighting of key terms, for example, can be useful to the medical scribe for quickly identifying relevant portions of the transcript and for generating the clinical note. In some implementations, portions of a transcript can be mapped to corresponding portions of a media file. In response to detecting a selection of a portion of the transcript in the transcript presentation control 446, for example, the interface 440 can cause playback of the corresponding portion of the media file through the media presentation control 442. As another example, as the file is being played in the media presentation control 442, a visual indicator (e.g., bold text, highlighted text, automatically scrolled text, or another sort of visual indicator) can indicate a portion of the transcript that corresponds to the portion of media currently being played. The mapping of a transcript to a media file, for example, can be useful to the medical scribe for reviewing important portions of the media file, or verifying portions of a transcript that are potentially incorrect.

In the present example, the provider preference presentation control 448 presents note preferences of the health care provider that conducted the encounter for which a clinical note is to be generated (e.g., preferences that have previously been submitted through the interface 340, shown in FIG. 3C). The medical scribe can review the note preferences (e.g., including templates to be used, formatting instructions, and other sorts of instructions) while generating a draft of the clinical note using the working area 450. In some implementations, portions of a draft clinical note can be pre-generated. For example, one or more templates referenced in the health care provider's preferences can be automatically incorporated into the working area 450, and relevant portions of text from the transcript can be automatically extracted into the template. The medical scribe can review the pre-generated draft clinical note, and edit and add to the note to complete it.

Occasionally, multiple patients may be referenced by a health care provider in a transcript and related media file(s). For example, multiple members of a family may arrive at a health care session conducted by the health care provider. If the health care provider conducted an encounter with multiple patients, for example, the medical scribe can interact with the add patient control 452, which can cause the remote scribe application to present an interface (e.g., interface 480, shown in FIG. 4E) for adding information for each of the additional patients referenced in the transcript/files to the encounter data for the encounter. For example, a patient name, date of birth, medical record number (MRN), and other relevant information can be specified for each patient.

Occasionally, an interference issue with the media file(s) and/or encounter metadata may be present. For example, various elements of the metadata can be missing or incorrect, a quality of the audio file can be insufficient, or another interference issue or defect can be present which interferes with the generation of a clinical note. If an interference issue is present, for example, the medical scribe can interact with the request missing information control 454, which can cause the remote scribe application to present an interface (e.g., interface 460, shown in FIG. 4D) for reporting issues with the media file(s) and/or encounter metadata. In the present example, interface 460 includes a set of user input selection controls for indicating interference issues related to patient information (e.g., missing name, incorrect name, missing date of birth, incorrect date of birth, missing medical record number, incorrect medical record number), a set of user input selection controls for indicating interference issues related to specialty statuses (e.g., waiting, missing information), a set of user input selection controls for indicating interference issues related to audio quality (e.g., noisy recording, unclear or inaudible speaking), or other user input selection controls for identifying other defects recognized in the media file(s) and/or encounter metadata. The medical scribe can select corresponding controls for any of the interference issues, and can provide other relevant feedback information.

In response to receiving interference issue reporting data specified by the medical scribe through the interface 460, for example, the server system 108 can change the status of the scribe's task to "Waiting," and can send a corresponding notification to practitioner interface device 102n of the health care provider. The practitioner interface device 102n can present the notification to the health care provider through the practitioner interface application, and the health care provider can address the issues. After the identified interference issue has been addressed, additional encounter data (e.g., including corrected metadata and/or additional media files) can be provided by the practitioner interface device 102n to the server system 108, which can in turn provide a corresponding notification to the remote scribe device 106n of the medical scribe to inform the scribe that additional data for the encounter is available. The notification can include various visual and/or audible elements to alert the medical scribe to new information or to currently assigned tasks or newly available tasks for the scribe. In the present example, the notification icon 410 presented in the upper-right hand corner of interface 440 (or another suitable location) can alert the medical scribe of the new information. The medical scribe can interact with (e.g., click, hover over, etc.) the icon, and a list of recently received notifications (e.g., during the current shift) can be presented to the medical scribe. The scribe can select any of the notifications, for example, and the interface 440 can be updated to present information that pertains to the selected notification (e.g., by navigating to a page for working on a task related to the notification).

Occasionally, an encounter task may be deemed suitable for various training scenarios. For example, a task can be typical (or atypical) of tasks for a particular provider, and a manager (e.g., a chief scribe, an administrator) can decide to maintain information related to the task for training medical scribes. If the manager selects the task for training, for example, the manager can interact with the copy to training control 456, which can cause the remote scribe application to copy the encounter data (e.g., including the metadata, the media files, the transcript, the provider preferences, and contents of the working area) to a training environment (not shown), for use in conducting medical scribe training. As part of a training exercise for a medical scribe, for example, the scribe can access the training environment and generate a clinical note based on the copied training encounter data, and the scribe's note can be compared to a previously generated note which can be considered as a preferred standard. Optionally, portions of the media file and/or the transcript can be annotated to guide trainees in generating a clinical note for the training encounter.

After generating the clinical note, for example, the medical scribe can interact with the mark completed control 458. In response to receiving an indication that the clinical note has been completed, for example, the server system 108 can update a status of the corresponding encounter (e.g., marking the clinical note for the encounter as being completed and/or uploaded). In some implementations, clinical notes can be automatically uploaded to an electronic health record (EHR) system of a health care provider. For example, the server system 108 can transfer a completed clinical note (e.g., from the working area 450) to the EHR system 110 in response to the clinical note being marked as completed through the control 458. In some implementations, clinical notes can be manually uploaded to an EHR system of a health care provider. For example, the medical scribe can manually provide a completed clinical note to the EHR system 110, and afterwards the scribe can mark the clinical note as being completed through the control 458. In some implementations, additional patient information can be collected as part of a process for completing a clinical note. For example, in response to interaction with the mark completed control 458, the medical scribe can be presented with interface 480 (shown in FIG. 4E). In the present example, for each patient that was present at the session, patient information (e.g., name, date of birth, medical record number) can be provided, and a category can be selected. Possible categories, for example, can include a completed chart in an EHR, a provider entering the chart in the EHR, or no EHR note being needed. The categories can be used for billing purposes, for example.

After an encounter task has been marked as completed, for example, the medical scribe can be returned to a suitable landing page (e.g., interface 400 or 420 shown in FIGS. 4A-B if tasks are to be at least partially self-assigned, or interface 440 if tasks are to be solely automatically assigned). The medical scribe can then proceed to work on another task or to end their shift. For example, the remote scribe application can include work schedule features for clocking in and out, and tracking a remaining amount of time in a shift. The encounter data for the completed task can be maintained for a suitable period of time for quality assurance purposes (e.g., three days, a week, a month, or another suitable period of time).

Figure 5A:
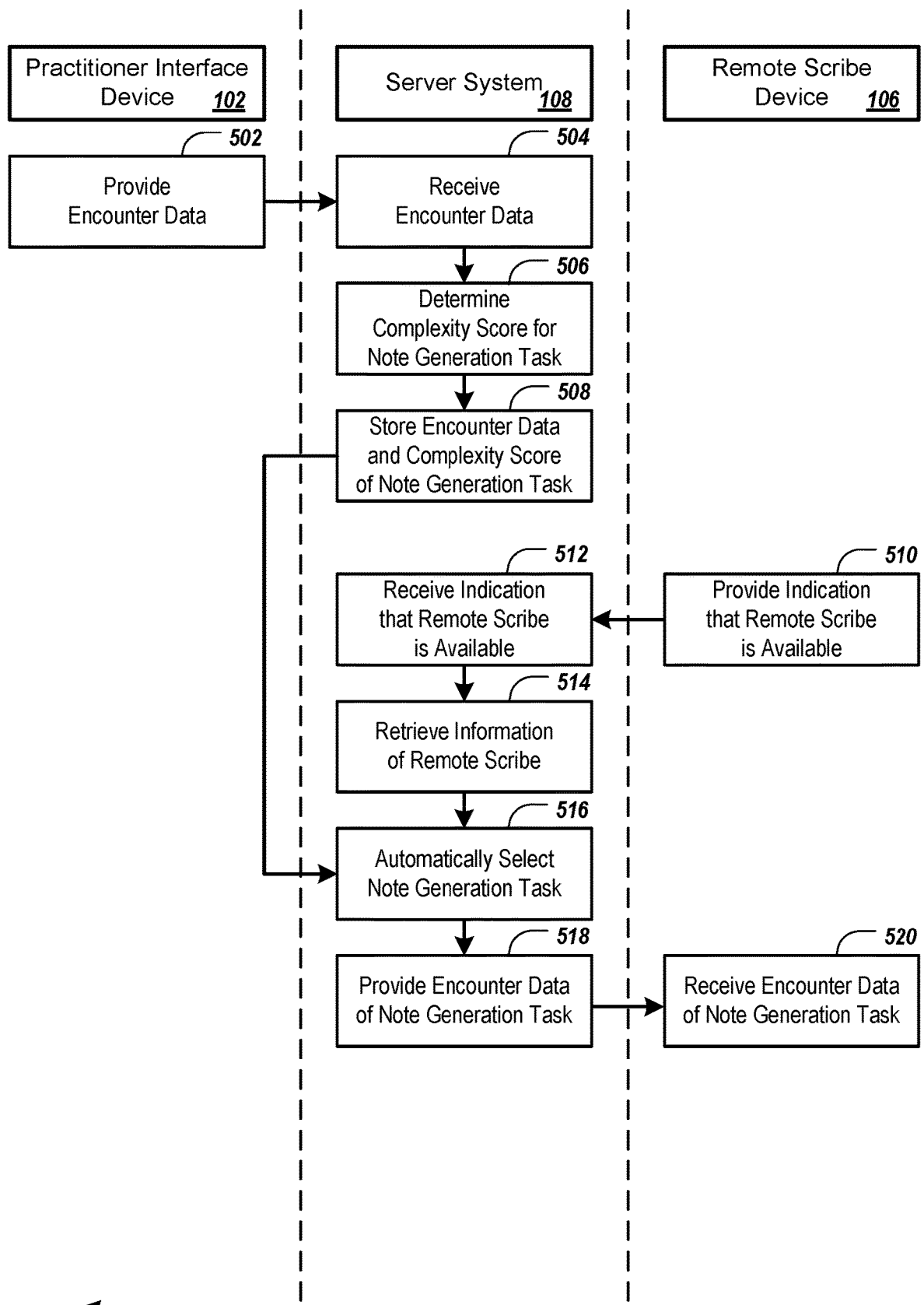
FIGS. 5A-B is a lane diagram of an example technique for automatically selecting clinical note generation tasks in a platform for facilitating the generation of clinical notes.
Figure 5B:
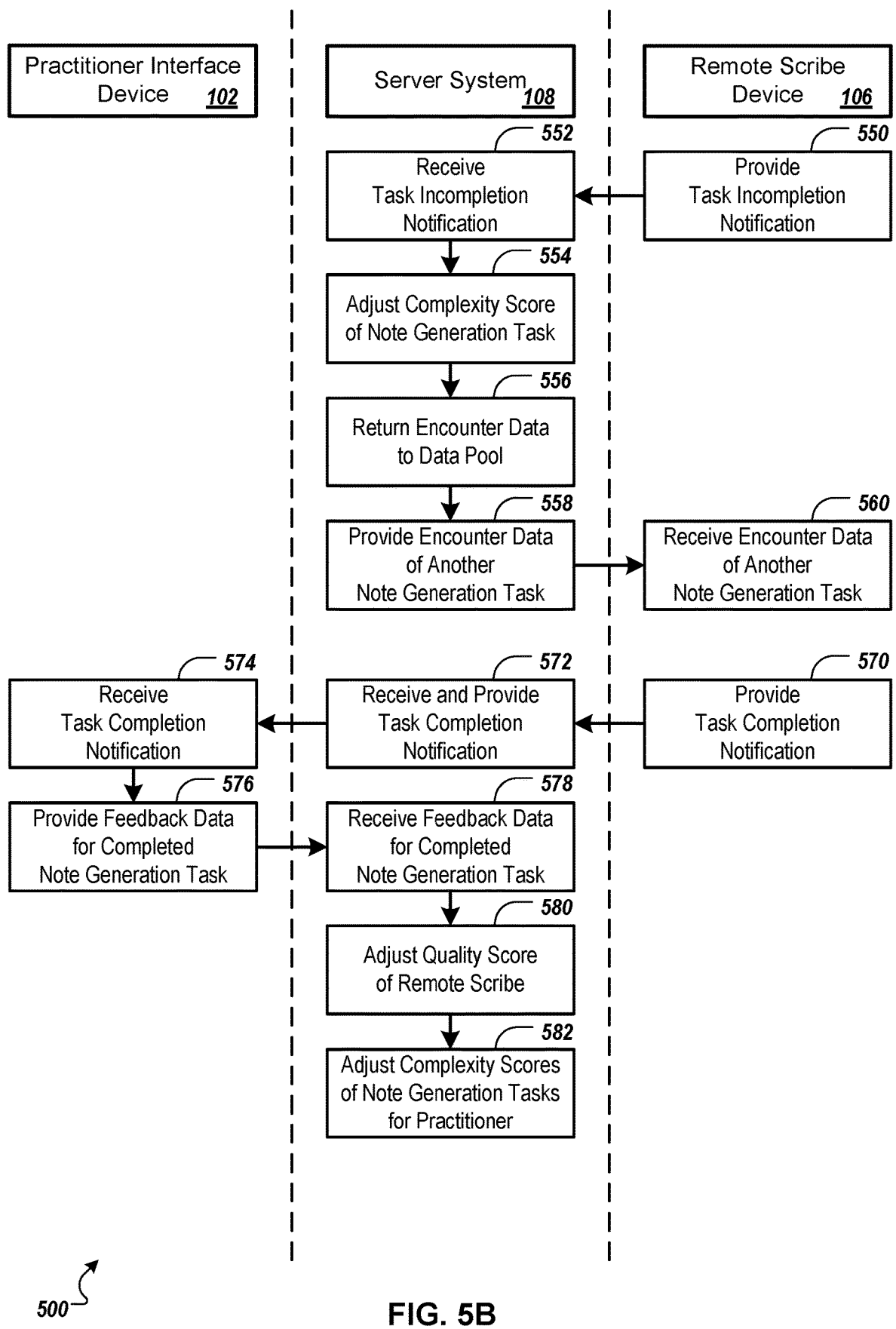

FIGS. 5A-B is a lane diagram of an example technique 500 for automatically selecting clinical note generation tasks (and/or other sorts of tasks) in a platform for facilitating the generation of clinical notes. In general, the example technique 500 can include operations for automatically selecting, for an available remote scribe in a pool of working scribes, a suitable task from a pool of tasks that are to be completed. Since the pool of tasks and the pool of working scribes continually change over time (as new tasks are generated and as the tasks are assigned, and as remote scribes come online and go offline), the automatic selection of suitable tasks for scribes is a computationally complex problem, which can be efficiently solved through interactions between the various computing devices of the platform, and through the maintenance and use of task complexity scores and scribe quality scores. In the present example, the technique 500 can be performed by the server system 108 (shown in FIG. 1), remote scribe device 106 (e.g., any of remote scribe devices 106a-n, also shown in FIG. 1), and practitioner interface device 102 (e.g., any of practitioner interface devices 102a-n, also shown in FIG. 1).

A practitioner interface device can provide encounter data to a server system (502). Through the practitioner interface 152, for example, the practitioner interface device 102 can provide to the server system 108 encounter data 132 that pertains to a health care session conducted between a health care provider (e.g., an operator of the practitioner interface device 102) and a patient. The encounter data 132, for example, can include audio data (e.g., one or more session recordings recorded during and/or after the session), and can include various encounter metadata associated with the session, provider, and/or patient.

The server system can receive the encounter data from the practitioner interface device (504). For example, the server system 108 can receive the encounter data 132 from the practitioner interface device 102. Optionally, the server system 108 can retrieve and/or generate additional encounter metadata related to the session, provider, and/or patient. In the present example, the encounter metadata (e.g., metadata specified through the practitioner interface device 102 and/or retrieved by the server system 108 from the projects data store 120) can include a provider project identifier (e.g., an identifier for a group of health care providers and associated medical scribes), a provider specialty (e.g., orthopedics, internal medicine, or another sort of specialty), a provider electronic health record (EHR) system, a provider care setting (e.g., urgent care, ambulatory, etc.), a provider location, a provider service level (e.g., a turnaround time for task completion), a session priority (e.g., "STAT" tasks vs. normal priority tasks), a session audio duration (e.g., a total duration of all audio for a session), and a session flow (e.g., an indication of a conversation between a provider and a patient, an indication of dictation performed by the provider, etc.). Other examples may include more metadata, less metadata, or different types of metadata.

The server system can determine a complexity score for a clinical note generation task for the health care session (506). For example, the server system 108 can determine, based on the encounter metadata related to the health care session, provider, and/or patient, a complexity score for generating a clinical note for the session. In some implementations, a complexity score for a clinical note generation task can be a weighted average based on various factors represented in the encounter metadata. For example, each encounter factor (e.g., a session metric, a provider metric, or a patient metric represented in the metadata) can be assigned a corresponding qualitative or quantitative value. Suitable weighting factors (e.g., values from zero to one, or another suitable range of values) can be qualitatively determined for each encounter factor, the weighting factors can be applied to the encounter factor values, and the weighted values can be aggregated. Aggregated task complexity scores can include numeric values (e.g., values from zero to one, or another suitable range of values), assigned label values (e.g., high, medium, low, etc.), binary values (e.g., complex vs. simple), or other suitable values. Techniques for determining a task complexity score are described in further detail above with respect to the automatic routing engine 240, for example.

Figure 7A:
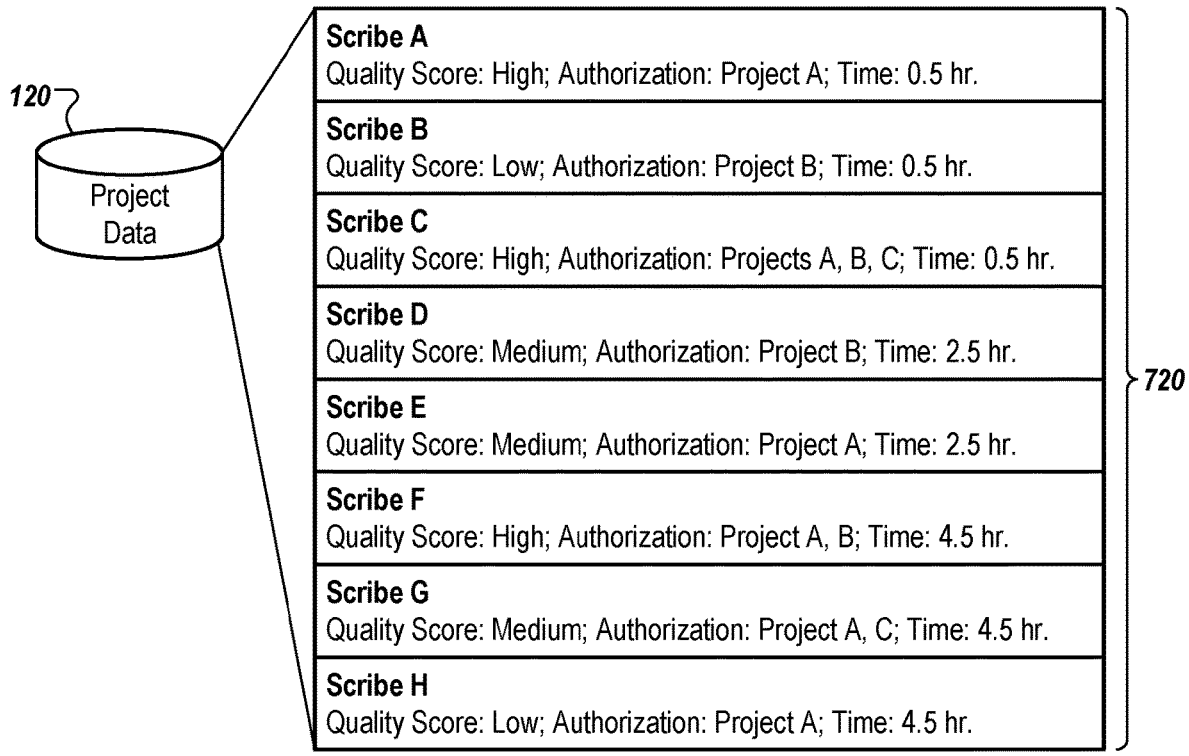
FIGS. 7A-B depict example pools of remote scribes and clinical note generation tasks to be completed.
Figure 7A:
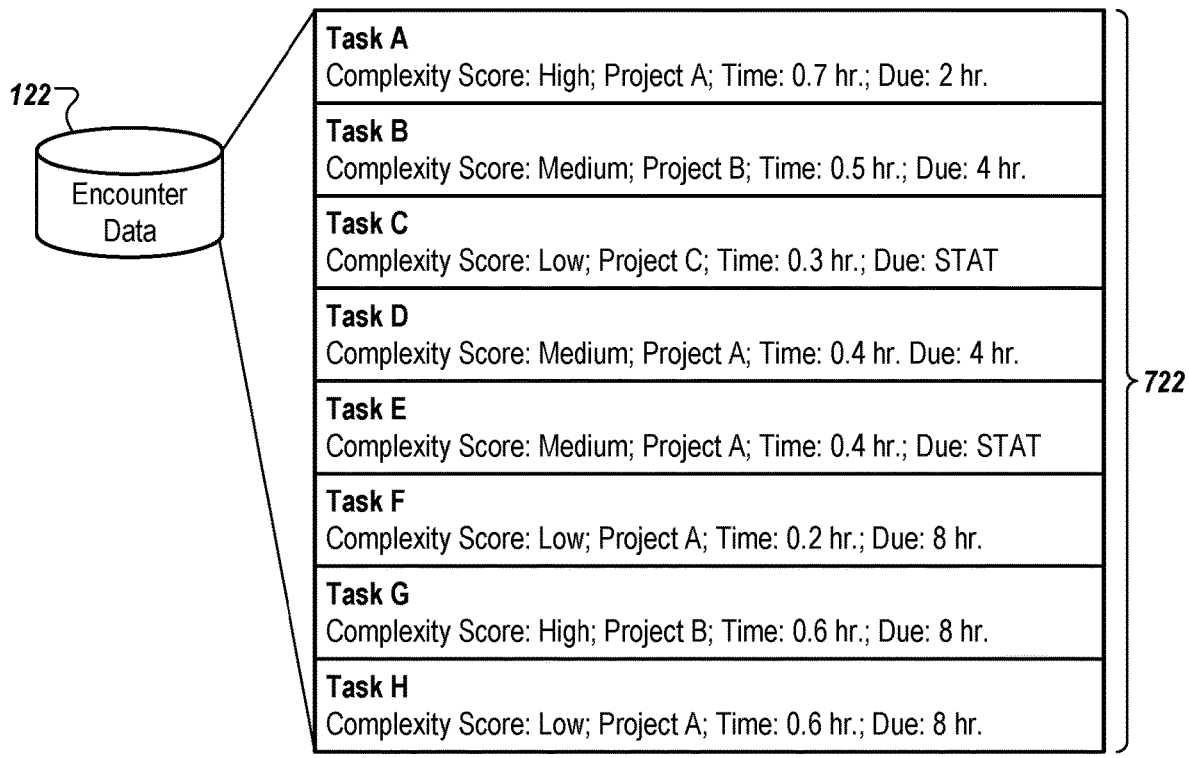

The server system can store the encounter data and the task complexity score (508). For example, the server system 108 can store the encounter data 132 with the determined complexity score of the clinical note generation task (and optionally, with at least a portion of the encounter metadata) in an encounter data pool (e.g., maintained by the encounter data store 122), along with previously received encounter data for previous health care sessions and previously determined complexity scores for other clinical note generation tasks. Referring now to FIG. 7A, for example, the encounter data store 122 can maintain an encounter data pool 722. For example, the encounter data pool 722 includes encounter data, encounter metadata, and determined task complexity scores for a set of tasks that are to be automatically assigned to remote scribes as the scribes become available to work on new tasks.

A remote scribe device can provide an indication that a remote scribe is available (510). Through the remote scribe interface 156, for example, the remote scribe device 106 can provide a scribe availability notification that a remote scribe (e.g., an operator of the remote scribe device 106) is available to work on a clinical note or another sort of task. The scribe availability notification, for example, can be provided in response to various sorts of scribe actions with the remote scribe interface 156, such as the remote scribe logging into the interface, the remote scribe using the interface to clock into a shift, the remote scribe interacting with a user interface control of the interface to request a non-specific task, the remote scribe completing a task, the remote scribe requesting a different task, or another sort of action.

The server system can receive the indication that the scribe is available to work on a task (512). For example, the server system 108 can receive the scribe availability notification from the remote scribe device 106 for a particular remote scribe, when the scribe is available for an automatic task assignment. In some implementations, scribe availability can be based at least in part on a current number of tasks that are assigned to a remote scribe. For example, if the remote scribe presently has a threshold number of tasks (e.g., one, two, three, or another suitable number of tasks) that are currently assigned to the scribe and not yet complete (e.g., the tasks are on hold, waiting for data, etc.), the server system 108 can determine that the scribe is not available to work on an additional task. In some implementations, scribe availability can be based at least in part on scheduling information of a remote scribe. For example, if a remainder of a scribe's shift is under threshold amount of time (e.g., five minutes, fifteen minutes, or another suitable amount of time), the server system 108 can determine that the scribe is not available to work on an additional task. In response to receiving the scribe availability notification, the server system can retrieve information related to the available remote scribe (514). For example, the server system 108 can retrieve a quality score of the remote scribe, and authorization information of the remote scribe.

A scribe's quality score can generally be based on various scribe metrics that are collected over time, as the scribe completes tasks in the clinical data platform. The scribe metrics, for example, can include an average or median amount of time for the scribe to complete a task, an average or median time spent listening to audio for a task, training completed by the scribe for various provider specialties (e.g., orthopedics, internal medicine, or other sorts of specialties), training completed by the scribe for various sorts of electronic health record (EHR) systems, scribe access to EHR systems, scribe availability (e.g., hours/day, hours/week, etc.), and/or quality ratings of tasks completed by the scribe (e.g., based on provider feedback and/or manager ratings). Other examples may include additional scribe metrics, fewer scribe metrics, or different scribe metrics.

In some implementations, a quality score for a scribe can be determined by performing a computation (e.g., a weighted average, a weighted sum, or another statistical computation) based on the various scribe metrics. For example, each scribe metric can be assigned a corresponding qualitative or quantitative value. Suitable weighting factors (e.g., values from zero to one) can be qualitatively determined for each scribe metric, the weighting factors can be applied to the scribe metric values, and the weighted values can be aggregated. Aggregated scribe quality scores can include numeric values (e.g., values from zero to one, or another suitable range of values), assigned label values (e.g., high, medium, low, etc.), binary values, or other suitable values. Quality scores can be maintained for each scribe (e.g., in memory, data storage, etc.), and optionally, at least a portion of a scribe's quality score can be determined at a time that it is to be used by the server system. For example, scribe metrics can change over time, as a scribe works on and is evaluated for completing tasks. By retrieving up-todate scribe metrics and computing a current quality score for a scribe, for example, the server system can dynamically adjust to changing conditions in a work environment.

In some implementations, multiple different quality scores can be maintained for a remote scribe, and each quality score can pertain to a different encounter factor (or combination of encounter factors). For example, a scribe can have a first quality score for tasks involving a first specialty (e.g., orthopedics), a second quality score for tasks involving a second specialty (e.g., internal medicine), and so forth. The specialties and the associated quality scores for tasks involving the specialties, for example, can be non-specific to particular providers. As another example, a scribe can have a first quality score for tasks that involve working with a first EHR system, a second quality score for tasks that involve working with a second EHR system, and so forth. Retrieving a quality score of the remote scribe can include retrieving/computing the quality score (from the multiple different quality scores) that pertains to the encounter factor of the health care session for which the scribe may be assigned a task. Thus, a customized and prioritized set of tasks can be determined for each scribe in a pool of scribes, based on factors related to the tasks and based on particular skills of the scribes.

Authorization information of the remote scribe can include identifiers for types of encounters for which the scribe is authorized to perform tasks. In general, the authorization information for a scribe can be updated as the scribe receives additional credentials and/or training. For example, a scribe can be authorized to work on tasks for one or more particular provider projects, provider specialties, and/or tasks that involve working with particular electronic health record (EHR) systems.

The server system can automatically select a suitable task for the remote scribe (516) from an encounter data pool. In general, selecting a task can be based at least in part on the complexity score of the task, the quality score of the remote scribe, and the authorization information of the remote scribe. For example, complexity scores that have been determined (506) and stored (508) for various tasks can be used for automatically selecting an aligned task for the remote scribe (e.g., a task that is aligned to the scribe's qualifications, skills, schedule, and/or current workload), along with the quality score and authorization information that has been determined (514) for the remote scribe. In some implementations, remote scribes can be placed in one or more distinct pools of remote scribes that have similar quality scores and that are authorized to work on similar clinical note generation tasks. A selected clinical note generation task can be matched with a suitable scribe pool (e.g., a team of scribes), for example, with the task being suitable for completion by any of the scribes in the scribe pool, based on the qualifications and skills of the scribes in the scribe pool. Each scribe pool, for example, can be matched with tasks for particular types of encounters, such as encounters for particular projects, encounters relating to particular provider specialties, encounters relating to particular care settings, encounters with tasks having particular complexity (e.g., complex tasks vs. simple tasks), and/or other types of encounters. Referring to FIG. 7A, for example, an overall pool of available scribes 720 can be partitioned into separate project-based scribe pools, each separate pool being matched to encounters for a different project. In the present example, Scribes A, C, E, F, G, and H can be placed in a pool for Project A, Scribes B, C, D, and F can be placed in a pool for Project B, and Scribes C and G can be placed in a pool for Project C. As encounters are added to the encounter data pool 722 (also shown in FIG. 7A), for example, the encounters can be mapped to a suitable scribe pool, such that a task for the encounter is eventually distributed to one of the scribes in the suitable scribe pool, and such that a matching process of tasks to scribes is simplified. In some implementations, matching a task to a scribe can be performed without maintaining distinct pools of scribes. For example, as a remote scribe becomes available, a most highly aligned task for the scribe can be selected based on characteristics of the scribe and characteristics of encounters in an encounter pool. As another example, when multiple remote scribes are waiting for tasks, an aligned scribe for the task (e.g., a scribe that is best suited to work on the task, based on scribe qualifications, skills, schedule, and/or current workload) can be selected when a task becomes available, based on characteristics of the scribes and characteristics of the tasks. By matching tasks to suitable scribes without maintaining distinct pools of scribes, for example, system flexibility can be improved.

Figure 6:
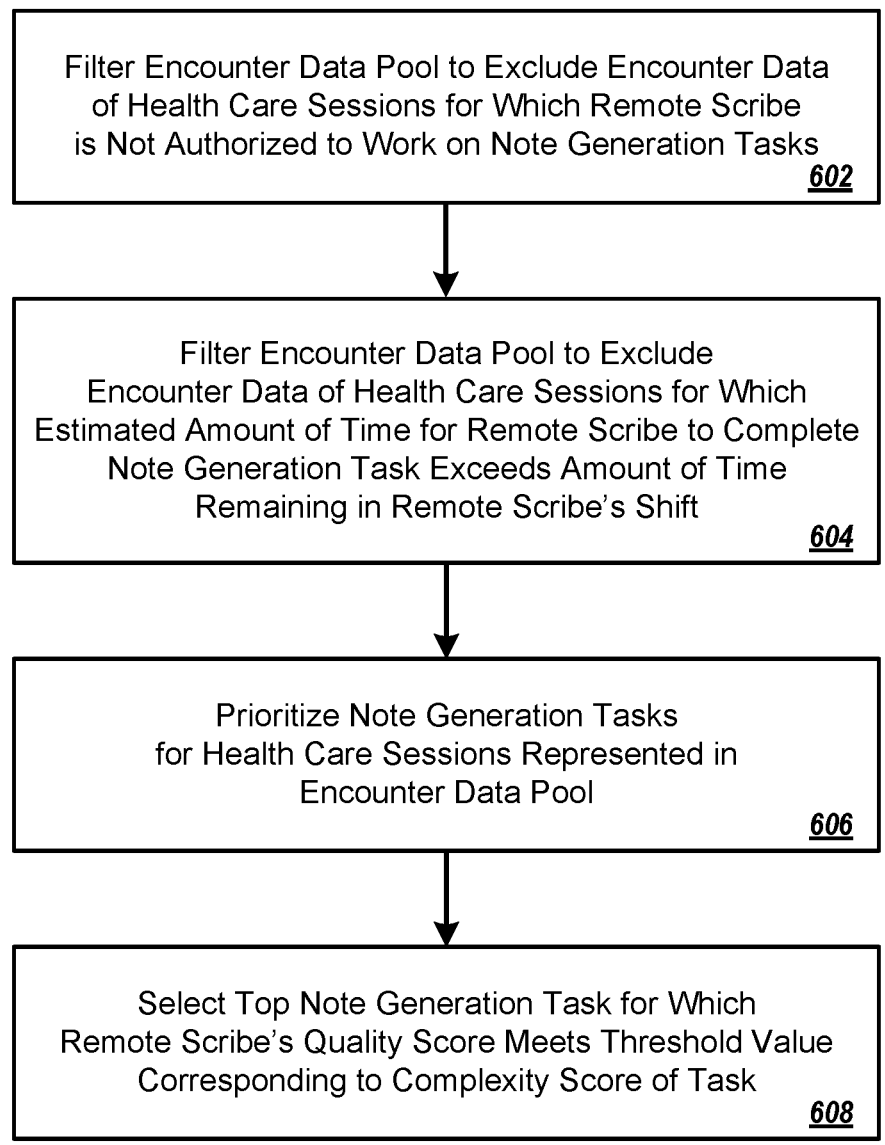
FIG. 6 is a flow diagram of an example technique for prioritizing and selecting a clinical note generation task for a remote scribe.

Referring now to FIG. 6, an example technique 600 is shown for prioritizing and selecting a clinical note generation task for a remote scribe. In the present example, the technique 600 can be performed by a server system (e.g., server system 108, shown in FIG. 1), and will be described with respect to FIG. 1 and FIGS. 7A-B for clarity. The technique 600 can be performed in the illustrated sequence, a different sequence, and/or two or more stages of the technique may be concurrent. In some implementations, one or more stages of the technique may be optional.

Figure 7B:
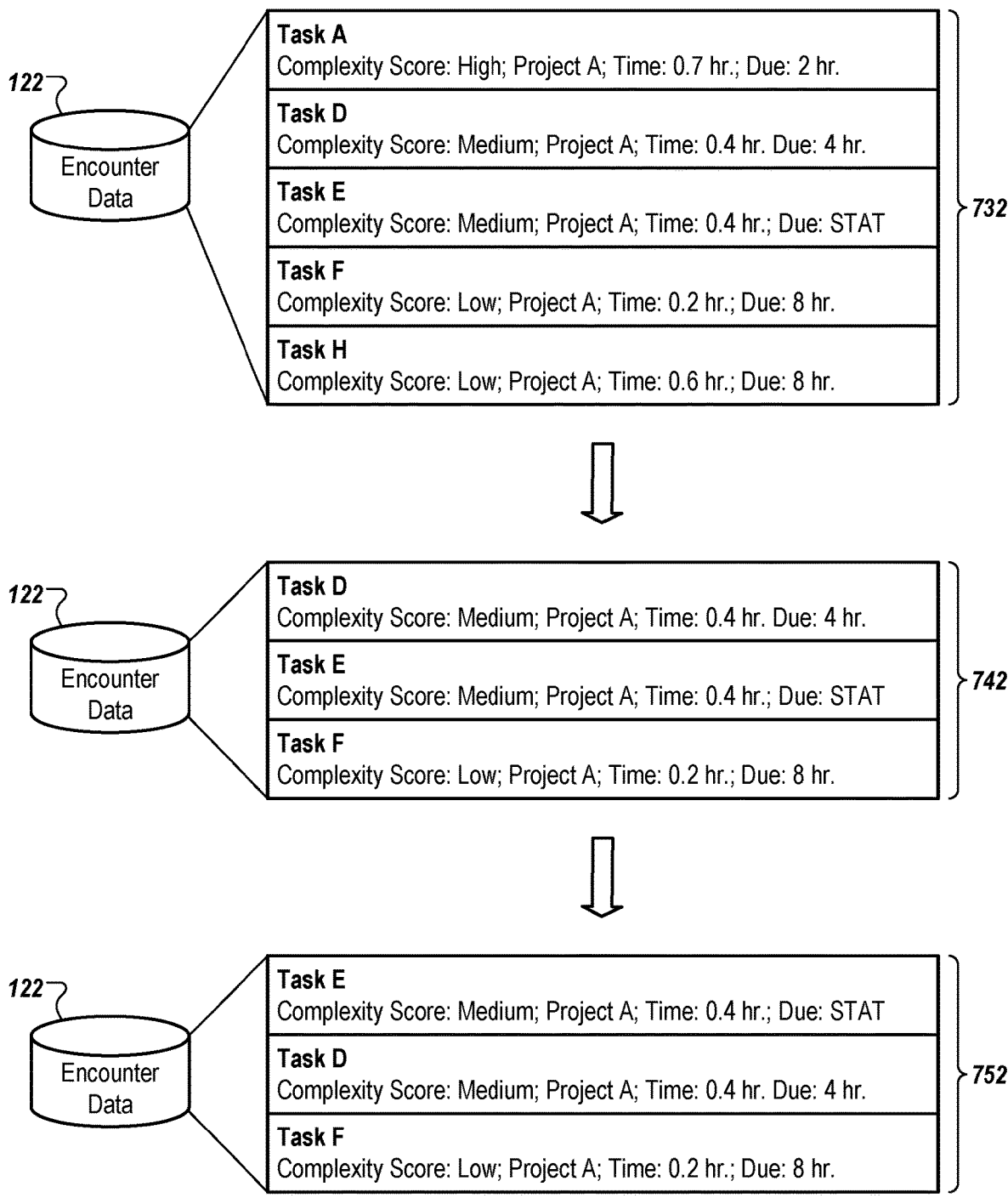

In some implementations, an encounter data pool can be filtered to exclude encounter data of health care sessions for which a remote scribe is not authorized to work on clinical note generation tasks, based on authorization information of the remote scribe (602). Referring to FIG. 7A, for example, if Scribe A were to become available for performing a task, the server system 108 can filter the encounter data pool 722 to exclude encounter data of health care sessions for which Scribe A is not authorized to work on tasks. In the present example, based on Scribe A's authorization information (e.g., Scribe A being authorized to work on tasks for Project A and not for Projects B and C), the encounter data pool 722 can be filtered to exclude encounter data for Projects B and C. Referring now to FIG. 7B, for example, an authorized encounter data pool 732 is shown that includes tasks for Project A and excludes tasks for Projects B and C. Although the present example shows the filtering of encounter data based on provider projects, in other examples, encounter data can be filtered based on other sorts of authorization information, such as provider specialties, electronic health record (EHR) systems, care settings, and other encounter factors, alone or in combination.

In some implementations, an encounter data pool can be filtered to exclude encounter data of health care sessions for which an estimated amount of time for a remote scribe to complete a clinical note generation task exceeds an amount of time remaining in the remote scribe's shift (604). Referring again to FIG. 7B, for example, the server system 108 can filter the encounter data pool 722 (or the authorized encounter data pool 732) to exclude encounter data of health care sessions for which an estimated amount of time for Scribe A to complete a task exceeds an amount of time remaining in Scribe A's shift (e.g., based on a number of tasks that are currently assigned to Scribe A). For example, for each health care session represented in an encounter data pool, an amount of time can be estimated for the remote scribe to complete the clinical note generation task, based at least in part on the length of audio included in the encounter data of the health care session (and optionally, based on historical completion times for the scribe, such that different scribes can have different estimated completion times for a same task). In the present example, Task A is estimated to take 0.7 hours for Scribe A to complete, Tasks D and E are each estimated to take 0.4 hours for Scribe A to complete, Task F is estimated to take 0.2 hours for Scribe A to complete, and Task H is estimated to take 0.6 hours for Scribe A to complete. An amount of time remaining in the remote scribe's shift can be determined and compared to the estimated amount of time for the remote scribe to complete each clinical note generation task, for example, and tasks which are estimated to take more time than the scribe's remaining shift time can be excluded. In the present example, since Scribe A has 0.5 hours remaining in a shift, the authorized encounter data pool 732 can be filtered to exclude Tasks A and H. For example, an authorized and time-filtered encounter data pool 742 is shown that includes Tasks D, E, and F, and that excludes Tasks A and H. Although the present example shows the sequential filtering of an encounter data pool, in other examples, encounter data can be filtered in a single stage, or in multiple stages in a different order.

In some implementations, note generation tasks for health care sessions represented in an encounter data pool can be prioritized (606). Referring again to FIG. 7B, for example, the server system 108 can prioritize tasks represented in the authorized and time-filtered encounter data pool 742 to generate a prioritized encounter data pool 752. In general, tasks can be ordered based on one or more time-related factors. For example, the tasks can be prioritized by priority level and service level, such that tasks that have been marked as "STAT" by a health care provider can be at the top of a task queue for a remote scribe, and other tasks can be ordered according to a provider's service level (e.g., a due date/time for completing the task).

In some implementations, a top clinical note generation task can be selected from prioritized note generation tasks, for which a remote scribe's quality score meets a threshold value corresponding to a complexity score of the clinical note generation task (608). Referring again to FIG. 7B, for example, the server system 108 can compare the quality score for Scribe A (e.g., High) to the complexity score of the top task represented in the prioritized encounter data pool 752 (e.g., Task E, with a complexity score of Medium). If the scribe's quality score sufficiently meets the complexity score, for example, the task can be selected for assignment to the scribe. In the present example, Task E can be assigned to Scribe A. However, if Scribe A were to have a Low quality score, for example, the top task in the prioritized encounter data pool 752 available for assignment to Scribe A may be further down the list of prioritized tasks (e.g., Task F, with a Low complexity score).

In some implementations, a quality score consideration can be omitted for high-priority tasks (e.g., "STAT" tasks and/or for tasks that are due for completion), for time-sensitive scenarios. For example, when a high-priority task is at the top of a prioritized encounter data pool for an available scribe, but the scribe's quality score is insufficient for working on the task, the server system 108 can determine whether any other scribes that are better qualified to work on the task will become available within a threshold amount of time (e.g., five minutes, ten minutes, etc.), based on current statuses across a pool of working scribes. If a better qualified scribe is not projected to become available, for example, the quality score consideration can be temporarily omitted, and the task can be assigned to the presently available scribe. By temporarily omitting quality score considerations, for example, throughput can be maintained in critical situations while generally facilitating suitable matches between scribes and tasks.

Referring again to FIGS. 5A-B, the server system can provide encounter data related to the task (518), and the remote scribe device can receive the encounter data related to the task (520). For example, the server system 108 can provide data representing the automatically selected clinical note generation task to the remote scribe device 106. After providing the encounter data related to the task, for example, the server system 108 can remove the task from a pool of available tasks (e.g., by updating a current tasks status, or through another suitable mechanism). After receiving the data for the automatically selected task, for example, the remote scribe device 106 can present at least a portion of the data at the remote scribe interface 156, to facilitate the generation of a clinical note for the encounter.

Occasionally, a remote scribe who has been automatically assigned a task (e.g., a clinical note generation task) may be unable to complete the task. If the remote scribe uses the remote scribe interface 156 to indicate an interference issue with the media file(s) and/or other encounter data provided for completing the task, for example, the server system 108 can update the task's status (e.g., to "Waiting", or a similar status), and can automatically assign a different task for the remote scribe device 106 while the interference issue is being addressed (e.g., by the provider who submitted the encounter data). In such a scenario, after the interference issue has been addressed, for example, the remote scribe may resume working on the original task. In some scenarios, however, remote scribes may determine that their capabilities are insufficient for completing an automatically assigned task (e.g., due to a lack of skill or training). In such scenarios, for example, the encounter data representing the task can be returned to an encounter data pool, the task can be assigned to a different remote scribe, and the remote scribe who rejected the task can be provided with encounter data for an alternate task.

The remote scribe device can provide a task incompletion notification to the server system (550), which can receive the task incompletion notification from the remote scribe device (552). For example, the remote scribe device 106 can provide to the server system 108 a task incompletion notification that indicates that the remote scribe is unable to complete the selected clinical note generation task. In the present example, Scribe A may be unable to complete Task E (which has been automatically selected from the prioritized encounter data pool 752, shown in FIG. 7B). Various reasons may lead to an inability of the scribe to complete the task, such as the scribe being unfamiliar with terminology referenced in the session audio, the scribe not understanding aspects of the provider preferences, the scribe ending a shift before completing the task, or another sort of reason. In some implementations, information that indicates a reason for an incomplete task can be provided. For example, the remote scribe interface 156 can include an interface similar to interface 460 (shown in FIG. 4D) for indicating that the remote scribe is unable to complete a task and for indicating the reason.

The server system can adjust a task complexity score (554), and the server system can return encounter data to the encounter data pool (556). Responsive to receiving the task incompletion notification, for example, the server system 108 can adjust the complexity score of the selected (and subsequently rejected) clinical note generation task. In the present example, the complexity score of Task E can be increased (e.g., from "Medium" to "High", or another sort of increase). Also responsive to receiving the task incompletion notification, for example, the server system 108 can return the encounter data of the selected clinical note generation task to the encounter data pool. In the present example, Task E can be returned to the encounter data pool 722 (e.g., by updating a status of the task from "Assigned" to "Available" or another sort of status change, and optionally by including data for a partially completed clinical note such that another scribe can continue working on the note), and Task E can be re-assigned to a different (and potentially more suitable) remote scribe.

The server system can provide encounter data of another selected task (558). In general, since the clinical data platform is a dynamic system in which tasks are continually being generated, assigned, updated, and completed, the state of the system continually changes over time. In the present example, since time has elapsed since Scribe A was initially assigned Task E, the server system 108 can again use technique 600 (shown in FIG. 6) for prioritizing and selecting a clinical note generation task for Scribe A. Referring to FIG. 7B, for example, Task D may no longer be available (e.g., the task may have been assigned to another scribe in the interim), so the server system 108 can automatically select Task F (or a newly generated task that is not shown) for Scribe A. The remote scribe device can receive the encounter data of the other selected task (560). In the present example, after receiving the data for Task F, for example, the remote scribe device 106 can present at least a portion of the data at the remote scribe interface 156, to facilitate the generation of a clinical note for the encounter.

The remote scribe can work on generating a clinical note for the encounter, and after the clinical note has been completed, the remote scribe device can provide a task completion notification to the server system (570). Through the remote scribe interface 156, for example, the remote scribe device 106 can provide to the server system 108 a task completion notification that indicates that the selected clinical note generation task has been completed. The task completion notification, for example, can be provided in response to the remote scribe interacting with a user interface control of the scribe interface 156 that marks a completion of a task.

The server system can receive the task completion notification from the remote scribe device, and responsive to receiving the notification, the server system can provide the notification to the practitioner interface device (572), which can receive the task completion notification (574). For example, the server system 108 can provide the task completion notification to the practitioner interface device 102. After receiving the task completion notification, for example, the practitioner interface device can present the notification to the health care provider through the practitioner interface 152. The health care provider can then review the completed clinical note (e.g., by accessing the note through the server system 108 or the electronic health record (EHR) system 110).

The practitioner interface device can provide feedback data for the completed task to the server system (576). For example, the health care provider can use the practitioner interface 152 of the practitioner interface device 102 to provide feedback data for the completed clinical note, and the feedback data can be provided to the server system 108. In some implementations, the feedback data can include one or more metric ratings. The metric ratings, for example, can pertain to overall note quality (e.g., spelling, grammar, use of correct terminology, etc.), whether the note adheres to preferences specified by the health care provider (e.g., use of specific templates, use of bulleted lists, etc.), and other suitable aspects of the completed note. To provide the metric ratings, for example, the practitioner interface 152 can include one or more controls through which the health care provider can submit corresponding scores. In some implementations, the feedback data can include audio feedback. For example, the practitioner interface 152 can include a recording control that the health care provider can select to initiate a spoken review of the completed clinical note for the task. By providing a mechanism for health care providers to easily provide feedback for specific tasks through the clinical data platform, for example, the feedback can be provided without directly including specific patient information, thus ensuring patient data privacy.

The server system can receive the feedback data that pertains to the completed task, from the practitioner interface device (578). For example, the server system 108 can receive the feedback data that has been submitted by the health care provider through the practitioner interface 152, from the practitioner interface device 102. The server system 108, for example, can store the feedback data in association with data related to the completed task and in association with data related to the remote scribe who completed the task. In some implementations, a notification of the feedback data can be presented by a manager interface (e.g., interface 400, shown in FIG. 4A) that presents information associated with tasks performed within the clinical data platform. For example, a remote scribe's manager can use the manager interface to review feedback (e.g., metric ratings and/or feedback audio) from a health care provider for a particular task that has been performed by a particular scribe.

The server system can adjust a quality score of a remote scribe, based on the received feedback data that pertains to the completed clinical note generation task (580). For example, the server system 108 can automatically increase a quality score of the remote scribe based on positive metric ratings from a health care provider for a task, or can automatically decrease a quality score of the remote scribe based on negative metric ratings from the health care provider for the task. As another example, the server system 108 can receive a manual quality score adjustment for the remote scribe, specified through the manager interface of the platform.

The server system can adjust complexity scores of other tasks for the practitioner (582). Based on the received feedback data that pertains to the completed clinical note generation task, for example, the server system 108 can adjust the complexity scores of other clinical note generation tasks for other health care sessions conducted by the health care provider. For example, if the health care provider generally provides positive metric ratings for remote scribes relative to other health care providers, complexity scores of clinical note generation tasks for the provider can be decreased, whereas if the health care provider generally provides negative metric ratings for remote scribes, complexity scores of clinical note generation tasks for the provider can be increased.

Figure 8:
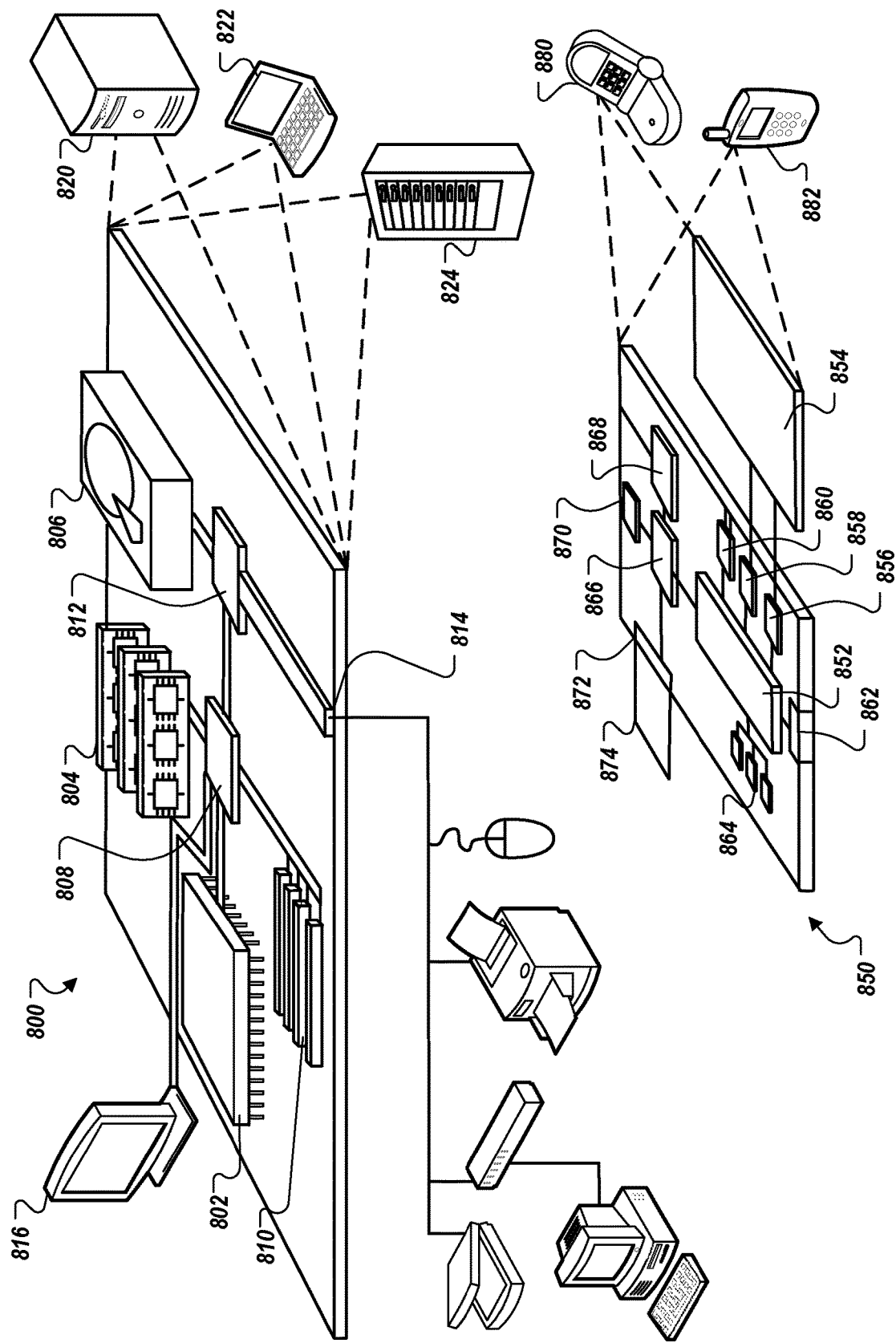
FIG. 8 is a schematic diagram that shows an example of a computing device and a mobile computing device.

FIG. 8 shows an example of a computing device 800 and an example of a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and can be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 804 stores information within the computing device 800. For example, the memory 804 is a volatile memory unit or units. For example, the memory 804 is a non-volatile memory unit or units. The memory 804 can also be another form of computer-readable medium, such as a magnetic or optical disk.

The storage device 806 is capable of providing mass storage for the computing device 800. For example, the storage device 806 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 804, the storage device 806, or memory on the processor 802.

The high-speed interface 808 manages bandwidth-intensive operations for the computing device 800, while the low-speed interface 812 manages lower bandwidth-intensive operations. Such allocation of functions is exemplary only. For example, the high-speed interface 808 is coupled to the memory 804, the display 816 (e.g., through a graphics processor or accelerator), and to the high-speed expansion ports 810, which can accept various expansion cards (not shown). In the implementation, the low-speed interface 812 is coupled to the storage device 806 and the low-speed expansion port 814. The low-speed expansion port 814, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 800 can be implemented in a number of different forms, as shown in the figure. For example, it can be implemented as a standard server 820, or multiple times in a group of such servers. In addition, it can be implemented in a personal computer such as a laptop computer 822. It can also be implemented as part of a rack server system 824. Alternatively, components from the computing device 800 can be combined with other components in a mobile device, such as mobile computing device 850. Each of such devices can contain one or more of the computing device 800 and the mobile computing device 850, and an entire system can be made up of multiple computing devices communicating with each other.

The mobile computing device 850 includes a processor 852, a memory 864, an input/output device such as a display 854, a communication interface 866, and a transceiver 868, among other components. The mobile computing device 850 can also be provided with a storage device, such as a micro-drive or other device, to provide additional storage. Each of the processor 852, the memory 864, the display 854, the communication interface 866, and the transceiver 868, are interconnected using various buses, and several of the components can be mounted on a common motherboard or in other manners as appropriate.

The processor 852 can execute instructions within the mobile computing device 850, including instructions stored in the memory 864. The processor 852 can be implemented as a chipset of chips that include separate and multiple analog and digital processors. The processor 852 can provide, for example, for coordination of the other components of the mobile computing device 850, such as control of user interfaces, applications run by the mobile computing device 850, and wireless communication by the mobile computing device 850.

The processor 852 can communicate with a user through a control interface 858 and a display interface 856 coupled to the display 854. The display 854 can be, for example, a TFT (Thin-Film-Transistor Liquid Crystal Display) display or an OLED (Organic Light Emitting Diode) display, or other appropriate display technology. The display interface 856 can comprise appropriate circuitry for driving the display 854 to present graphical and other information to a user. The control interface 858 can receive commands from a user and convert them for submission to the processor 852. In addition, an external interface 862 can provide communication with the processor 852, so as to enable near area communication of the mobile computing device 850 with other devices. The external interface 862 can provide, for example, for wired communication For example, or for wireless communication in other implementations, and multiple interfaces can also be used.

The memory 864 stores information within the mobile computing device 850. The memory 864 can be implemented as one or more of a computer-readable medium or media, a volatile memory unit or units, or a non-volatile memory unit or units. An expansion memory 874 can also be provided and connected to the mobile computing device 850 through an expansion interface 872, which can include, for example, a SIMM (Single In Line Memory Module) card interface. The expansion memory 874 can provide extra storage space for the mobile computing device 850, or can also store applications or other information for the mobile computing device 850. Specifically, the expansion memory 874 can include instructions to carry out or supplement the processes described above, and can include secure information also. Thus, for example, the expansion memory 874 can be provide as a security module for the mobile computing device 850, and can be programmed with instructions that permit secure use of the mobile computing device 850. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. For example, a computer program product is tangibly embodied in an information carrier. The computer program product contains instructions that, when executed, perform one or more methods, such as those described above. The computer program product can be a computer- or machine-readable medium, such as the memory 864, the expansion memory 874, or memory on the processor 852. For example, the computer program product can be received in a propagated signal, for example, over the transceiver 868 or the external interface 862.

The mobile computing device 850 can communicate wirelessly through the communication interface 866, which can include digital signal processing circuitry where necessary. The communication interface 866 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 868 using a radio-frequency. In addition, short-range communication can occur, such as using a Bluetooth, WiFi, or other such transceiver (not shown). In addition, a GPS (Global Positioning System) receiver module 870 can provide additional navigation- and location-related wireless data to the mobile computing device 850, which can be used as appropriate by applications running on the mobile computing device 850.

The mobile computing device 850 can also communicate audibly using an audio codec 860, which can receive spoken information from a user and convert it to usable digital information. The audio codec 860 can likewise generate audible sound for a user, such as through a speaker, e.g., in a handset of the mobile computing device 850. Such sound can include sound from voice telephone calls, can include recorded sound (e.g., voice messages, music files, etc.) and can also include sound generated by applications operating on the mobile computing device 850.

The mobile computing device 850 can be implemented in a number of different forms, as shown in the figure. For example, it can be implemented as a cellular telephone 880. It can also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method comprising:
receiving, by a server system and from a practitioner interface device, encounter data of a health care session conducted between a health care provider and a patient, the encounter data including audio data;
trimming, by an audio processing engine at the server system, the audio data by detecting voice activity in the audio data based on based on at least one frequency and eliminating at least one portion from the audio data where the voice activity is not detected;
determining, by the server system, a complexity score for a clinical note generation task for the health care session, based at least in part on (i) a length of the audio data included in the encounter data, and (ii) a session type of the health care session;
storing the encounter data with the determined complexity score of the clinical note generation task in an encounter data pool, along with previously received encounter data for previous health care sessions and previously determined complexity scores for other clinical note generation tasks;
receiving, by the server system and from a remote scribe device, an indication that a remote scribe is available to work on a clinical note;
placing the remote scribe in a particular pool of remote scribes from among multiple pools of remote scribes, the particular pool of remote scribes having similar quality scores and being authorized to work on similar clinical note generation tasks;
in response to receiving the indication, retrieving, by the server system, a quality score of the remote scribe, and authorization information of the remote scribe;
automatically selecting, by the server system from the encounter data pool, a clinical note generation task for the remote scribe based at least in part on the clinical note generation task being matched with the particular pool of remote scribes from among the multiple pools of remote scribes, wherein the clinical note generation task is matched with the particular pool of remote scribes based at least in part on (i) the complexity score of the clinical note generation task, (ii) the quality score of the remote scribe, and (iii) the authorization information of the remote scribe; and
providing data representing the selected clinical note generation task, by the server system and to the remote scribe device for presentation at a clinical note generation interface of the remote scribe device.

2. The computer-implemented method of claim 1, wherein automatically selecting the clinical note generation task for the remote scribe device comprises:
filtering the encounter data pool to exclude encounter data of health care sessions for which the remote scribe is not authorized to work on clinical note generation tasks, based on the authorization information of the remote scribe.

3. The computer-implemented method of claim 1, wherein automatically selecting the clinical note generation task for the remote scribe device comprises:
for each health care session represented in the encounter data pool, estimating an amount of time for the remote scribe to complete the clinical note generation task, based at least in part on the length of the audio data included in the encounter data of the health care session;
determining an amount of time remaining in the remote scribe's shift; and
filtering the encounter data to exclude encounter data of health care sessions for which the estimated amount of time for the remote scribe to complete the clinical note generation task exceeds the amount of time remaining in the remote scribe's shift.

4. The computer-implemented method of claim 1, wherein automatically selecting the clinical note generation task for the remote scribe comprises:
prioritizing clinical note generation tasks for the health care sessions represented in the encounter data pool; and
selecting, from the prioritized clinical note generations tasks, a top clinical note generation task for which the quality score of the remote scribe meets a threshold value corresponding to the complexity score of the clinical note generation task.

5. The computer-implemented method of claim 1, wherein the selected clinical note generation task is aligned for completion by any of the remote scribes in the particular pool of remote scribes.

6. The computer-implemented method of claim 1, further comprising:
receiving, by the server system and from the remote scribe device, a task completion notification that indicates that the selected clinical note generation task has been completed;
responsive to receiving the task completion notification, providing by the server system and to the practitioner interface device, the task completion notification; and
after providing the task completion notification to the practitioner interface device, receiving, from the practitioner interface device, feedback data that pertains to the completed clinical note generation task.

7. The computer-implemented method of claim 6, further comprising:
adjusting the quality score of the remote scribe, based on the received feedback data that pertains to the completed clinical note generation task.

8. The computer-implemented method of claim 6, further comprising:
adjusting the complexity scores of other clinical note generation tasks for other health care sessions conducted by the health care provider, based on the received feedback data that pertains to the completed clinical note generation task.

9. The computer-implemented method of claim 1, further comprising:
receiving, by the server system and from the remote scribe device, a task incompletion notification that indicates that the remote scribe is unable to complete the selected clinical note generation task; and
responsive to receiving the task incompletion notification, (i) returning the encounter data to the encounter data pool, and (ii) adjusting the complexity score of the selected clinical note generation task.

10. The computer-implemented method of claim 1, wherein multiple different quality scores are maintained for the remote scribe, each quality score pertaining to a different encounter factor, wherein retrieving the quality score of the remote scribe comprises retrieving the quality score that pertains to the encounter factor of the health care session.

11. A computer system comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by a server system and from a practitioner interface device, encounter data of a health care session conducted between a health care provider and a patient, the encounter data including audio data;

trimming, by an audio processing engine at the server system, the audio data by detecting voice activity in the audio data based on at least one frequency and eliminating at least one portion from the audio data where the voice activity is not detected;

determining, by the server system, a complexity score for a clinical note generation task for the health care session, based at least in part on (i) a length of the audio data included in the encounter data, and (ii) a session type of the health care session;

storing the encounter data with the determined complexity score of the clinical note generation task in an encounter data pool, along with previously received encounter data for previous health care sessions and previously determined complexity scores for other clinical note generation tasks;

receiving, by the server system and from a remote scribe device, an indication that a remote scribe is available to work on a clinical note;

placing the remote scribe in a particular pool of remote scribes from among multiple pools of remote scribes, the particular pool of remote scribes having similar quality scores and being authorized to work on similar clinical note generation tasks;

in response to receiving the indication, retrieving, by the server system, a quality score of the remote scribe, and authorization information of the remote scribe;

automatically selecting, by the server system from the encounter data pool, a clinical note generation task for the remote scribe based at least in part on the clinical note generation task being matched with the particular pool of remote scribes from among the multiple pools of remote scribes, wherein the clinical note generation task is matched with the particular pool of remote scribes based at least in part on (i) the complexity score of the clinical note generation task, (ii) the quality score of the remote scribe, and (iii) the authorization information of the remote scribe; and providing data representing the selected clinical note generation task, by the server system and to the remote scribe device for presentation at a clinical note generation interface of the remote scribe device.

12. The computer system of claim 11, wherein automatically selecting the clinical note generation task for the remote scribe device comprises:

filtering the encounter data pool to exclude encounter data of health care sessions for which the remote scribe is not authorized to work on clinical note generation tasks, based on the authorization information of the remote scribe.

13. The computer system of claim 11, wherein automatically selecting the clinical note generation task for the remote scribe device comprises:

for each health care session represented in the encounter data pool, estimating an amount of time for the remote scribe to complete the clinical note generation task, based at least in part on the length of the audio data included in the encounter data of the health care session;

determining an amount of time remaining in the remote scribe's shift; and filtering the encounter data to exclude encounter data of health care sessions for which the estimated amount of time for the remote scribe to complete the clinical note generation task exceeds the amount of time remaining in the remote scribe's shift.

14. The computer system of claim 11, wherein automatically selecting the clinical note generation task for the remote scribe comprises:

prioritizing clinical note generation tasks for the health care sessions represented in the encounter data pool; and selecting, from the prioritized clinical note generations tasks, a top clinical note generation task for which the quality score of the remote scribe meets a threshold value corresponding to the complexity score of the clinical note generation task.

15. The computer system of claim 11, wherein the selected clinical note generation task is aligned for completion by any of the remote scribes in the particular pool of remote scribes.

16. The computer system of claim 11, the operations further comprising:

receiving, by the server system and from the remote scribe device, a task completion notification that indicates that the selected clinical note generation task has been completed;

responsive to receiving the task completion notification, providing by the server system and to the practitioner interface device, the task completion notification; and after providing the task completion notification to the practitioner interface device, receiving, from the practitioner interface device, feedback data that pertains to the completed clinical note generation task.

17. The computer system of claim 16, the operations further comprising:

adjusting the quality score of the remote scribe, based on the received feedback data that pertains to the completed clinical note generation task.

18. The computer system of claim 16, the operations further comprising:

adjusting the complexity scores of other clinical note generation tasks for other health care sessions conducted by the health care provider, based on the received feedback data that pertains to the completed clinical note generation task.

19. The computer system of claim 11, the operations further comprising:

receiving, by the server system and from the remote scribe device, a task incompletion notification that indicates that the remote scribe is unable to complete the selected clinical note generation task; and responsive to receiving the task incompletion notification, (i) returning the encounter data to the encounter data pool, and (ii) adjusting the complexity score of the selected clinical note generation task.

20. The computer system of claim 11, wherein multiple different quality scores are maintained for the remote scribe, each quality score pertaining to a different encounter factor, wherein retrieving the quality score of the remote scribe comprises retrieving the quality score that pertains to the encounter factor of the health care session.

21. A computer-implemented method comprising:
  receiving encounter data of a health care session conducted between a health care provider and a patient, the encounter data including audio data;
  trimming, by an audio processing engine, the audio data by detecting voice activity in the audio data based on at least one frequency and eliminating at least one portion from the audio data where the voice activity is not detected;
  storing the encounter data in an encounter data pool, along with previously received encounter data for previous health care sessions;
  receiving an indication that a remote scribe is available to work on a clinical note;
  in response to receiving the indication, retrieving authorization information of the remote scribe;
  placing the remote scribe in a particular pool of remote scribes from among multiple pools of remote scribes, the particular pool of remote scribes having similar quality scores and being authorized to work on similar clinical note generation tasks;
  automatically selecting, from the encounter data pool, a clinical note generation task for the remote scribe based at least in part on the clinical note generation task being matched with the particular pool of remote scribes from among the multiple pools of remote scribes, wherein the clinical note generation task is matched with the particular pool of remote scribes based at least in part on the authorization information of the remote scribe; and
  providing data representing the selected clinical note generation task to a remote scribe device for presentation at a clinical note generation interface of the remote scribe device.

22. A computer-implemented method comprising:
  receiving a particular pool of remote scribes from among multiple pools of remote scribes, the particular pool of remote scribes having similar quality scores and being authorized to work on similar clinical note generation tasks;
  automatically selecting a clinical note generation task for a remote scribe in the particular pool of remote scribes based at least in part on the clinical note generation task being matched with the particular pool of remote scribes from among the multiple pools of remote scribes;
  providing data representing the automatically selected clinical note generation task to a remote scribe device for presentation at a clinical note generation interface of the remote scribe device, wherein the data representing the automatically selected clinical note generation task includes audio data that is trimmed by an audio processing engine detecting voice activity in the audio data based on at least one frequency and eliminating at least one portion from the audio data where the voice activity is not detected;
  receiving, from the remote scribe device, a task completion notification that indicates that the automatically selected clinical note generation task has been completed;
  responsive to receiving the task completion notification, providing to a practitioner interface device, the task completion notification; and
  after providing the task completion notification to the practitioner interface device, receiving, from the practitioner interface device, feedback data that pertains to the completed clinical note generation task.

23. A computer-implemented method comprising:
  receiving a particular pool of remote scribes from among multiple pools of remote scribes, the particular pool of remote scribes having similar quality scores and being authorized to work on similar clinical note generation tasks;
  automatically selecting a clinical note generation task for a remote scribe in the particular pool of remote scribes based at least in part on the clinical note generation task being matched with the particular pool of remote scribes from among the multiple pools of remote scribes;
  providing data representing the automatically selected clinical note generation task to a remote scribe device for presentation at a clinical note generation interface of the remote scribe device, wherein the data representing the automatically selected clinical note generation task includes audio data that is trimmed by an audio processing engine detecting voice activity in the audio data based on based on at least one frequency and eliminating at least one portion from the audio data where the voice activity is not detected;
  receiving, from the remote scribe device, a task incompletion notification that indicates that the remote scribe is unable to complete the automatically selected clinical note generation task; and
  responsive to receiving the task incompletion notification, (i) automatically selecting a different clinical note generation task for the remote scribe, and (ii) providing data representing the different clinical note generation task to the remote scribe device for presentation at the clinical note generation interface of the remote scribe.

* * * * *